US012693477B2

(12) United States Patent
Canzonieri et al.

(10) Patent No.:  US 12,693,477 B2
(45) Date of Patent:       Jul. 28, 2026

(54) PITCH CONVERSION FERRULE BOOT

(71) Applicant: CommScope Technologies LLC, Hickory, NC (US)

(72) Inventors: Paige E. Canzonieri, Brooklyn Park, MN (US); Richard S. Tiev, Shakopee, MN (US); Jaime Gonzalez Batista, Prior Lake, MN (US); Scott L Carlson, Bloomington, MN (US); Yu Lu, Eden Prairie, MN (US); Bruce Ogren, Edina, MN (US); Chinmay M. Bendale, Eden Prairie, MN (US); Joseph Fredrick Cowdery, Eden Prairie, MN (US); Seth C. Taccola, Lakeville, MN (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 214 days.

(21) Appl. No.: 18/497,752

(22) Filed: Oct. 30, 2023

(65) Prior Publication Data

US 2024/0061183 A1      Feb. 22, 2024

Related U.S. Application Data

(63) Continuation of application No. PCT/US2022/026926, filed on Apr. 29, 2022.

(60) Provisional application No. 63/182,376, filed on Apr. 30, 2021, provisional application No. 63/295,170, filed on Dec. 30, 2021, provisional application No. 63/335,605, filed on Apr. 27, 2022.

(51) Int. Cl.
| *G02B 6/36* | (2006.01) |
| *G02B 6/38* | (2006.01) |

(52) U.S. Cl.
CPC .......... *G02B 6/368* (2013.01); *G02B 6/3861* (2013.01); *G02B 6/3885* (2013.01)

(58) Field of Classification Search
CPC ..... G02B 6/368; G02B 6/3861; G02B 6/3885
See application file for complete search history.

(56) References Cited

U.S. PATENT DOCUMENTS

| 5,214,730 | A | 5/1993 | Nagasawa et al. |
| 6,085,003 | A | 7/2000 | Knight |
| 8,684,611 | B2 | 4/2014 | Childers et al. |
| 9,086,555 | B2 | 7/2015 | Namazue et al. |
| 9,116,321 | B2 | 8/2015 | Sato et al. |

(Continued)

FOREIGN PATENT DOCUMENTS

| JP | 2014-211512 A | 11/2014 | |
| WO | 2020/046711 A1 | 3/2020 | |
| WO | WO-2021020073 A1 * | 2/2021 | .......... G02B 6/3885 |

OTHER PUBLICATIONS

Machine translation of Kanno et al WO-2021020073-A1 (Year: 2021).*

(Continued)

*Primary Examiner* — Ryan A Lepisto
(74) *Attorney, Agent, or Firm* — Merchant & Gould P.C.

(57) ABSTRACT

The present disclosure relates to a ferrule boot that provides a pitch conversion from fiber ribbon having a first pitch (e.g., about 200 microns) to a multi-fiber ferrule having fiber openings arranged at a second pitch larger than the first pitch (e.g., about 250 microns). The ferrule boot may also function as a tool for inserting pitch converted optical fibers into the multi-fiber ferrule.

19 Claims, 22 Drawing Sheets

(56) References Cited

U.S. PATENT DOCUMENTS

| | | | | |
|---|---|---|---|---|
| 9,778,423 | B2 * | 10/2017 | Watanabe | G02B 6/38875 |
| 9,880,368 | B2 | 1/2018 | Debban et al. | |
| 9,891,391 | B2 * | 2/2018 | Watanabe | G02B 6/3887 |
| 9,989,723 | B2 | 6/2018 | Hoshino et al. | |
| 9,995,896 | B2 | 6/2018 | Namazue et al. | |
| 10,007,078 | B2 | 6/2018 | Sato et al. | |
| 10,101,549 | B2 | 10/2018 | Hoshino et al. | |
| 10,175,421 | B2 * | 1/2019 | Tasker | G01H 9/004 |
| 10,185,105 | B2 | 1/2019 | Risch et al. | |
| 10,416,403 | B2 | 9/2019 | Okada et al. | |
| 10,488,609 | B2 | 11/2019 | Sato et al. | |
| 10,514,517 | B2 | 12/2019 | Sato et al. | |
| 11,243,348 | B2 * | 2/2022 | Brown | G02B 6/44384 |
| 11,467,348 | B2 * | 10/2022 | Verheyden | G02B 6/3809 |
| 11,630,267 | B2 * | 4/2023 | Lu | G02B 6/3888 |
| | | | | 385/78 |
| 11,782,223 | B2 * | 10/2023 | Kanno | G02B 6/3881 |
| | | | | 385/53 |
| 2013/0136401 | A1 | 5/2013 | Cooke et al. | |
| 2018/0011253 | A1 | 1/2018 | Childers et al. | |
| 2018/0210153 | A1 | 7/2018 | Daily et al. | |
| 2020/0271879 | A1 | 8/2020 | Fallahmohammadi et al. | |

OTHER PUBLICATIONS

International Search Report and Written Opinion for Application No. PCT/US2022/026926 mailed Aug. 18, 2022.

* cited by examiner

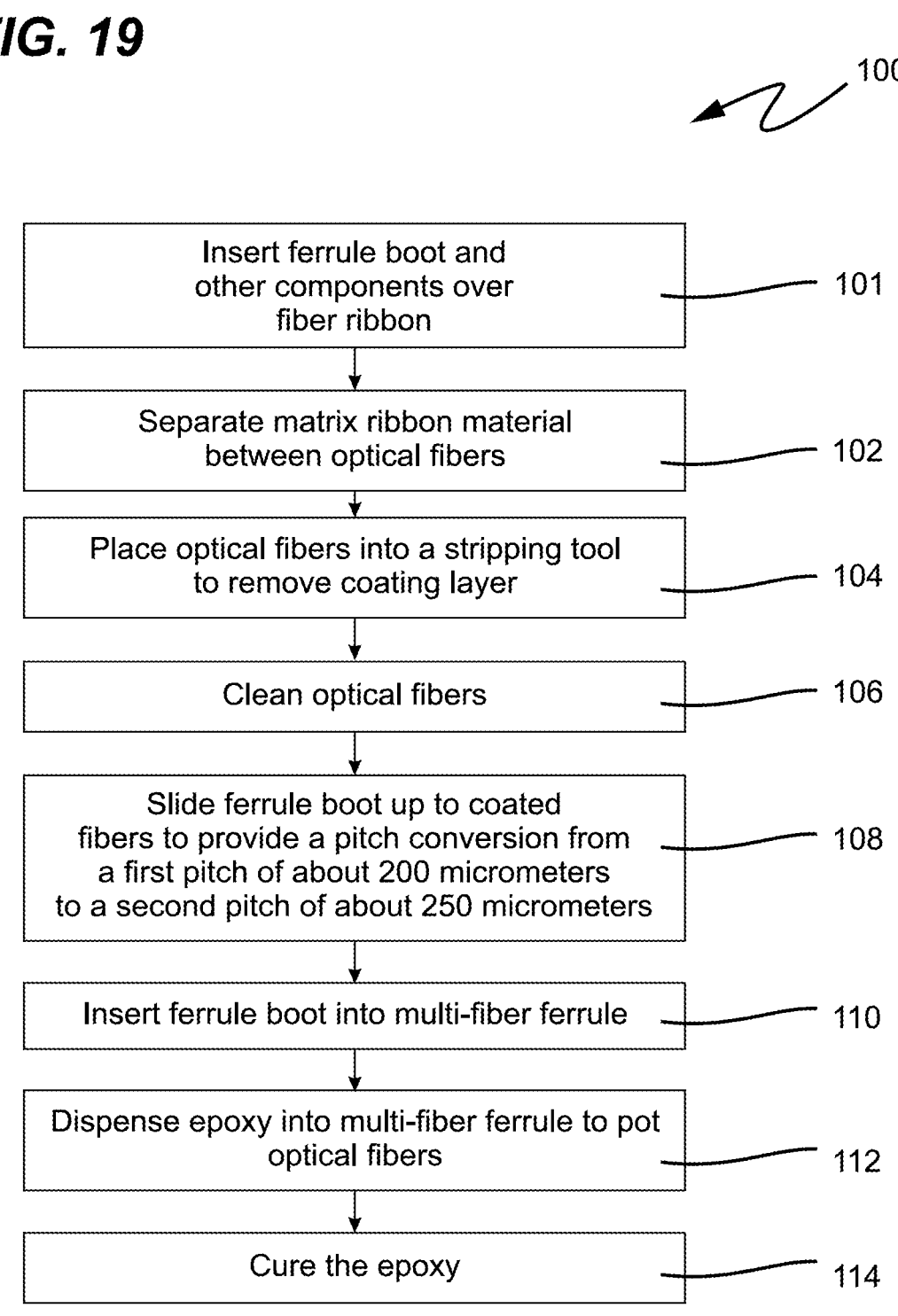

100

Insert ferrule boot and
other components over
fiber ribbon — 101

Separate matrix ribbon material
between optical fibers — 102

Place optical fibers into a stripping tool
to remove coating layer — 104

Clean optical fibers — 106

Slide ferrule boot up to coated
fibers to provide a pitch conversion from
a first pitch of about 200 micrometers
to a second pitch of about 250 micrometers — 108

Insert ferrule boot into multi-fiber ferrule — 110

Dispense epoxy into multi-fiber ferrule to pot
optical fibers — 112

Cure the epoxy — 114

PITCH CONVERSION FERRULE BOOT

CROSS-REFERENCE TO RELATED APPLICATIONS

This application is a Continuation of International Patent Application No. PCT/US2022/026926 filed on Apr. 29, 2022, which claims the benefit of U.S. Patent Application Ser. No. 63/182,376, filed on Apr. 30, 2021, claims the benefit of U.S. Patent Application Ser. No. 63/295,170, filed on Dec. 30, 2021 and claims the benefit of U.S. Patent Application Ser. No. 63/335,605, filed on Apr. 27, 2022, the disclosures of which are incorporated herein by reference in their entireties. To the extent appropriate, a claim of priority is made to each of the above disclosed applications.

TECHNICAL FIELD

The present disclosure relates generally to fiber optic connectors, components of fiber optic connectors, and assemblies including fiber optic connectors and optical fibers.

BACKGROUND

A multi-fiber fiber optic connector, for example an MPO connector, typically includes a connector housing supporting a multi-fiber ferrule at a distal end and a connector boot at a proximal end. Example multi-fiber fiber optic connectors are disclosed by U.S. Pat. Nos. 5,214,730; 6,085,003 and 8,684,611.

A conventional multi-fiber fiber optic connector includes a connector housing, a multi-fiber ferrule such as an MT ferrule mounted upon end portions of a plurality of optical fibers, a spring and a spring push. Typically, the multi-fiber ferrule is positioned within a lengthwise extending passageway defined by the connector housing. The optical fibers are often incorporated as part of a ribbon that is routed into the ferrule. Within the ferrule, the fibers are separated and routed to individual fiber holes of the ferrule. The fibers are secured within the ferrule by epoxy. Conventionally, the ribbon passes through a ferrule boot mounted at the back end of the ferrule which prevents epoxy from leaking out the back end of the ferrule during injection of the epoxy into the ferrule for fiber securement. A typical ferrule boot includes a single elongated slot sized to receive the optical fiber ribbon. However, PCT International Publication Number WO 2020/046711 discloses a ferrule assembly including a ferrule boot having a plurality of separate openings each configured for receiving an individual optical fiber.

Single-mode optical fibers can have a geometry that includes a central core size between 8-10 microns in outer diameter, a cladding layer with an outer diameter of 120-130 micrometers (typically about 125 microns), and a coating layer (e.g., acrylate) with an outer diameter in the range of 245-255 microns (typically about 250 microns). Such fibers have been incorporated into fiber ribbons having fibers retained with a center-to-center spacing (i.e., pitch) of about 250 microns. 12-Fiber MT/MPO ferrules including fiber openings having a pitch of about 250 microns have been used with this type of fiber ribbon.

In more recent years, single-mode optical fibers having coatings with outer diameters significantly less than 250 microns (e.g., 200 micron) have become available. Such optical fibers have been incorporated into fiber ribbons having the fibers retained at a pitch significantly less than 250 microns (e.g., about 200 microns).

There is a need for methods and components for facilitating using a fiber optic ribbon having fibers retained at a first pitch with a multi-fiber ferrule having fiber openings arranged at a second pitch that is larger than the first pitch.

SUMMARY

Aspects of the present disclosure relate to a pitch conversion apparatus such as a ferrule boot that provides a pitch conversion from a fiber ribbon having a first pitch (e.g., about 200 microns) to a multi-fiber ferrule having fiber openings arranged at a second pitch larger than the first pitch (e.g., about 250 microns).

Aspects of the present disclosure also relate to using a pitch conversion apparatus in the form of a ferrule boot as a fiber insertion tool for inserting a plurality of optical fibers having a converted fiber pitch into a multi-fiber ferrule.

Another aspect of the present disclosure relates to a fiber optic assembly. The fiber optic assembly can include a fiber ribbon that has a plurality of optical fibers maintained at a first center-to-center spacing. The fiber optic assembly can include a multi-fiber ferrule that has a front end and a rear end. The multi-fiber ferrule includes a row of ferrule fiber openings adjacent the front end of the ferrule. The ferrule fiber openings can be arranged at a second center-to-center spacing that is larger than the first center-to center spacing. The optical fibers have end portions secured within the ferrule fiber openings such that the end portions of the optical fibers are arranged at the second center-to-center spacing within the multi-fiber ferrule. The fiber optic assembly includes a ferrule boot that can be secured within the multi-fiber ferrule adjacent the rear end of the multi-fiber ferrule. The ferrule boot defines a row of ferrule boot fiber openings arranged at the second center-to-center spacing. The plurality of optical fibers can be arranged to extend through the ferrule boot fiber openings.

A further aspect of the present disclosure relates to a method for assembling optical fibers of a fiber ribbon within ferrule fiber openings of a multi-fiber ferrule. The optical fibers include a first center-to-center spacing at a ribbonized portion of the fiber ribbon. The ferrule fiber openings have a second center-to-center spacing that is larger than the first center-to-center spacing. The method includes the following steps: 1) de-coupling the optical fibers from one another adjacent an end portion of the fiber ribbon such that a pitch of the optical fibers can be modified from the first center-to-center spacing; 2) routing end portions of the optical fibers through ferrule boot fiber openings of a ferrule boot arranged at the second center-to-center spacing; and 3) inserting the end portions of the optical fibers into the ferrule fiber openings while the optical fibers are maintained at the second-center-to-center spacing by the ferrule boot.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 13 is a rear end view of the ferrule boot with fibers routed through the ferrule boot.

FIG. 14 is a cross-section view taken along section line 14-14 of FIG. 13.

FIG. 19 is a flow chart illustrating a method of making a fiber optic assembly in accordance with the principle of the present disclosure.

FIG. 20 is a rear end view of an alternate example of a ferrule boot in accordance with the principles of the present disclosure configured for converting the pitch of the optical fibers of a 16-fiber optical ribbon.

FIG. 23 shows the ferrule boot of FIG. 22 with fiber pairs loaded into the ferrule boot.

DETAILED DESCRIPTION

The present application relates to a fiber optic assembly that includes a fiber ribbon having optical fibers arranged at a first pitch, ferrule boot, and a multi-fiber ferrule defining fiber openings arranged at a second pitch. The first pitch is smaller than the second pitch, and the ferrule boot provides pitch conversion between the first and second pitches. The ferrule boot can also function as an insertion tool for effectively inserting the optical fibers of the ribbon into the fiber openings of the multi-fiber ferrule. The ferrule boot also acts as strain relief and helps to prevents adhesive such as epoxy resin from flowing out of the ferrule prior to curing.

In a conventional optical fiber ribbon, coated optical fibers are encapsulated within a volume of matrix material (e.g., acrylate) that secures the optical fibers in a particular order with the fibers being relatively rigidly held in a planar array at a given location along the length of the ribbon. In other examples, the optical fibers can be secured together via a rollable-ribbon configuration in which relative positioning (e.g., a sequence and pitch) of the optical fibers is established but that the optical fibers are movable relative to one another. Rollable ribbon configurations often provide intermittent connections between the optical fibers, utilize slits in the matrix material to allow the ribbon to be rolled, or use thin layers of matrix material sometimes at only one side of the group of aligned fibers.

Examples of rollable ribbons are disclosed in U.S. Pat. Nos. 10,185,105; 9,880,368; 10,488,609; 10,007,078; 9,995, 896; 9,086,555; 10,416,403; 9,116,321; 10,514,517; 9,989, 723, 10,101,549, the disclosures of which are hereby incorporated herein by reference in their entirety. Examples of rollable ribbons also are disclosed in U.S. Publication No. 2020/0271879, the disclosure of which is hereby incorporated herein by reference in its entirety. Other examples of rollable ribbons include the Freeform Ribbon™ produced by Sumitomo of Japan, rollable ribbons produced by OFS Furukawa of Norcross, GA, the SpiderWeb® Ribbon produced by AFL Telecommunications, LLC of Duncan, SC, and FlexRibbon™ m of Prysmian Group of Italy.

Figure 1:
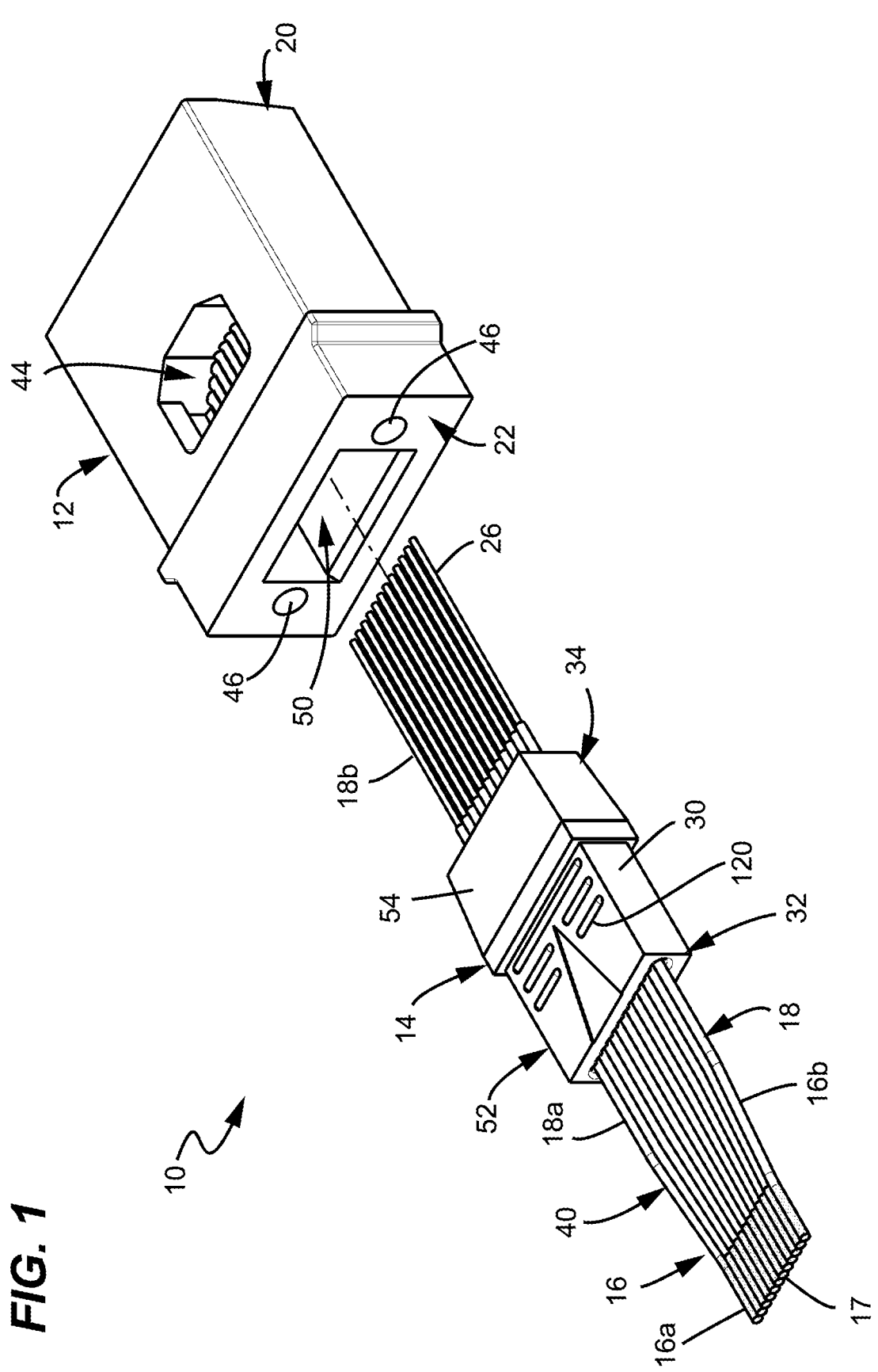
FIG. 1 is a perspective view of an example fiber optic assembly including a ferrule boot, a multi-fiber ferrule and a plurality of optical fibers in accordance with principles of the present disclosure.
Figure 2:
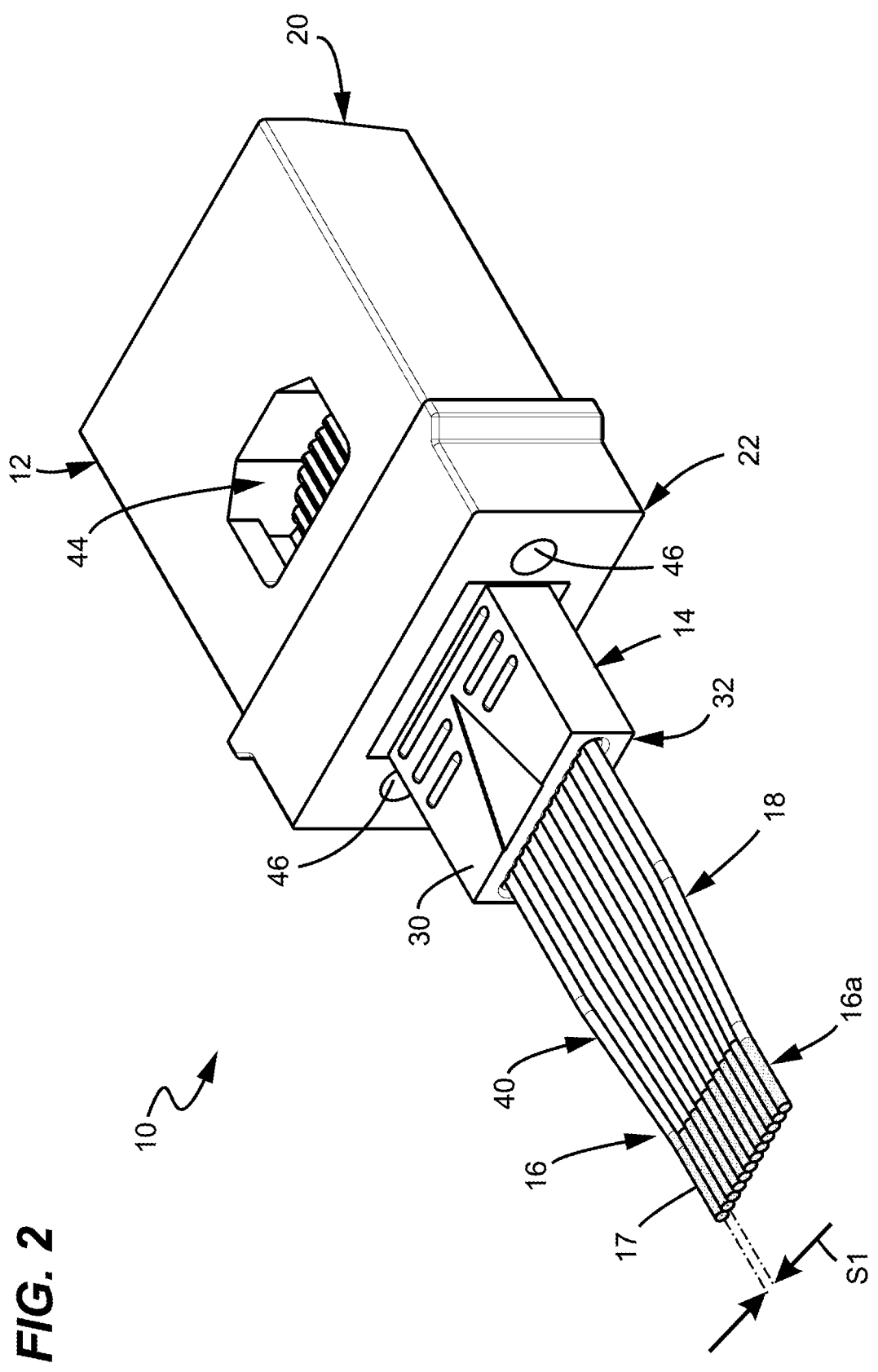
FIG. 2 is a perspective view of the fiber optic assembly of FIG. 1 showing a portion of the ferrule boot mounted within the multi-fiber ferrule.

An example fiber optic assembly 10 is shown at FIGS. 1 and 2. The fiber optic assembly 10 includes a multi-fiber ferrule 12, a ferrule boot 14, and a fiber ribbon 16 including a plurality of optical fibers 18. The fiber ribbon 16 can include a ribbonized portion 16a and a non-ribbonized portion 16b. At the ribbonized portion, 16a, a matrix material 17 (e.g., acrylate) bonds the optical fibers 18 together in a particular order and with a first pitch. The matrix material can include a conventional optical fiber ribbon configuration or a rollable optical fiber ribbon configuration. The matrix material 17 has been removed at the non-ribbonized portion such that the fibers 18 can be moved relative to one another to vary the pitch. The non-ribbonized portion 16b includes a coated fiber portion 18a in which the optical fibers are each protected by a coating layer and a bare fiber portion 18b in which the optical fibers are each not protected by a coating layer. The multi-fiber ferrule 12 has parallel ferrule fiber openings 24 arranged at a second pitch. The first pitch corresponds to a center-to-center fiber spacing $S_1$ (see FIG. 8) and the second pitch corresponds to a center-to-center opening/fiber spacing $S_2$ (see FIG. 8). The spacing $S_1$ is smaller than the spacing $S_2$. In one example, the spacing $S_1$ is less than or equal to 210 microns, or is about 200 microns.

In one example, the spacing $S_2$ is in the range of 240-260 microns, or is about 250 microns. The ferrule boot 14 can function as a pitch converter to convert the plurality of optical fibers 18 from the smaller first pitch to the larger second pitch. The ferrule boot 14 can also function as an insertion tool for inserting the pitch converted portions (e.g., including the bare fiber portions 18b) of the optical fibers 18 into the openings 24 of the multi-fiber ferrule 12. The ferrule boot 14 preferably has an elastomeric construction and in one example can have a material composition that includes a thermoplastic elastomer.

Figure 3:
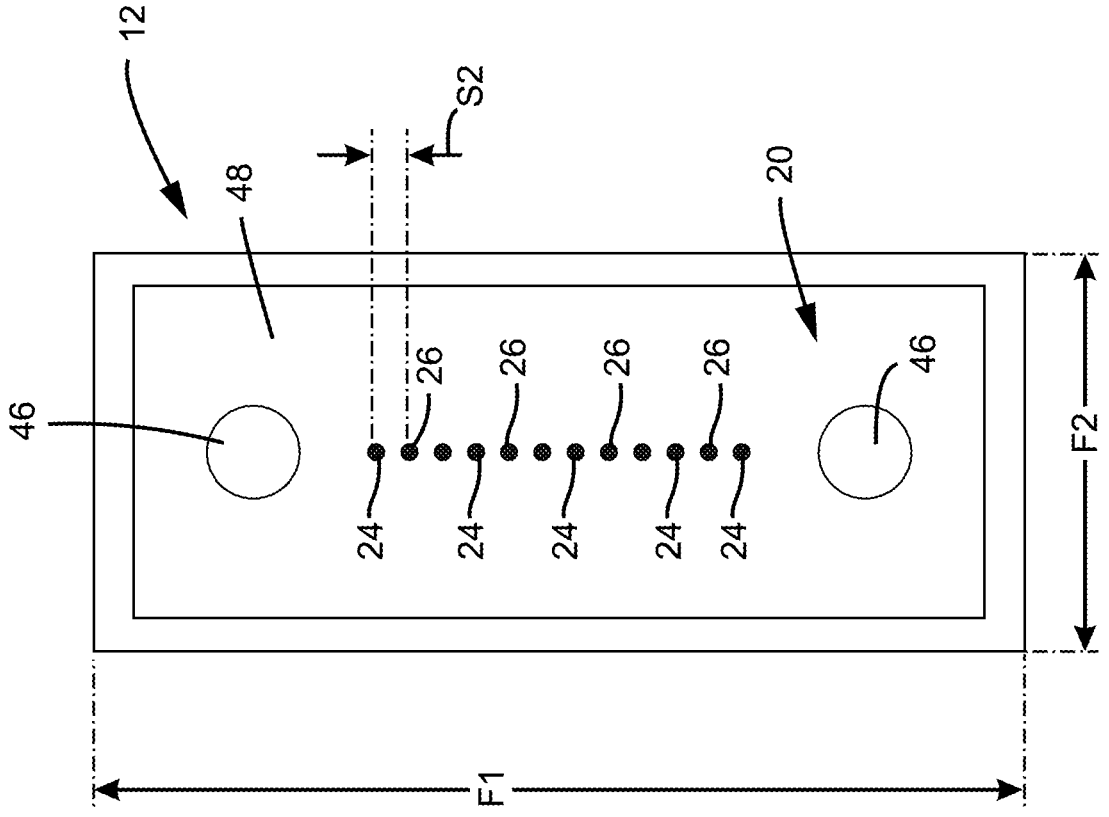
FIG. 3 is a distal end view of the multi-fiber ferrule of FIG. 1.
Figure 4:
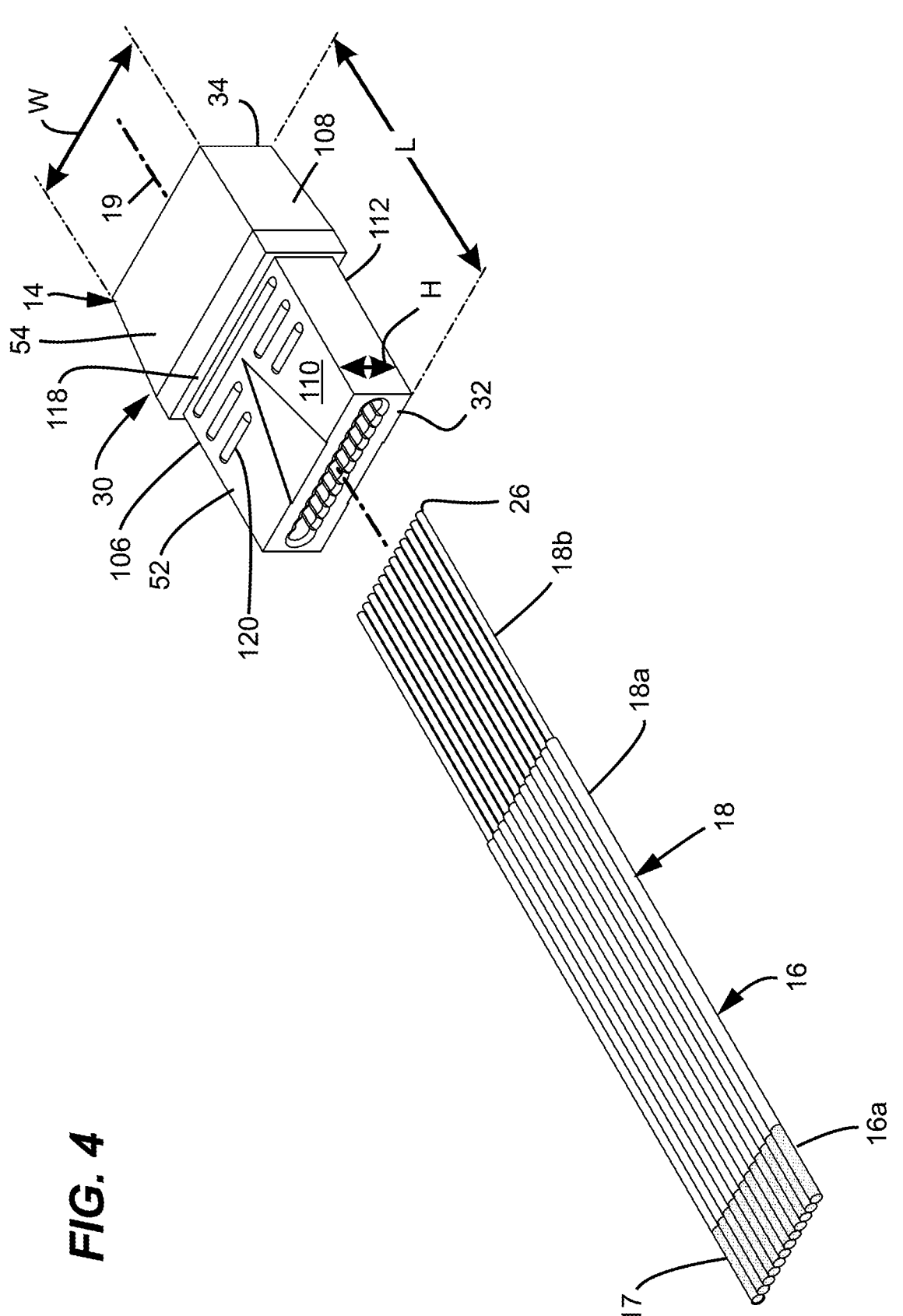
FIG. 4 is a perspective view of the ferrule boot of FIG. 1 showing the optical fibers prior to insertion.

The multi-fiber ferrule 12 includes a distal end 20 (i.e., a front end or free end) and a proximal end 22 (i.e., a base end or a rear end). The multi-fiber ferrule 12 defines one or more rows of the ferrule fiber openings 24 (e.g., passages, bores) (see FIG. 3) adjacent the distal end 20 of the multi-fiber ferrule 12 for receiving end portions 26 (e.g., bare fiber portions 18b) of the optical fibers 18. The openings 24 are arranged at the second pitch (i.e., center-to-center spacing $S_2$) and preferably have diameters slightly larger than the bare fiber portions 18b of the fibers 18 (e.g., slightly larger than 125 microns).

The plurality of optical fibers 18 can each comprise a core made of a light transmissive material such as glass, a cladding layer surrounding the core made of a material having a lower index of refraction as compared to the material of the core, and a polymeric coating layer (e.g., acrylate) surrounding the cladding layer. In one example, the core can have a diameter ranging from 5-15 microns, the cladding layer can have an outer diameter ranging from 120-130 microns, and the coating layer can have an outer diameter less than 210 microns (e.g., about 200 microns).

The matrix material 17 of the fiber ribbon 16 maintains the plurality of optical fibers 18 at the first pitch corresponding to the first center-to-center spacing $S_1$ (see FIG. 2). The center-to-center spacing can correspond to the coating diameters of the optical fibers 18 (e.g., less than 210 microns, or about 200 microns).

Referring to FIGS. 4, 6, 8 and 9, the ferrule boot 14 includes a length L, a width W and a height H. The length L extends between a front end 34 and a rear end 32 of the ferrule boot 14. A longitudinal axis 19 of the ferrule boot 14 is shown extending along the length L. The width W extends between a first minor side 106 and a second minor side 108 of the ferrule boot 14. The minor sides 106, 108 extend between the front and rear ends 32, 34 of the ferrule boot 14 and across the height H of the boot 14. The ferrule boot 14 further includes first and second major sides 110, 112 separated by the height H. The major sides 110, 112 across the width W extend between the minor sides 106, 108 and along the length L between the front and rear ends 32, 34.

The ferrule boot 14 includes a main body 30 including a front portion 54 and a rear portion 52. The front portion 54 is adapted to be pressed within a rear end of the ferrule 12 and has exterior tapered configuration for causing the front portion to be compressed and to undergo some elastomeric deformation when pressed into the rear end of the ferrule 12 to facilitate initial retention of the boot 14 within the ferrule 14. The exterior tapered configuration of the front portion 54 tapers in the width W orientation and the height H orientation as the front portion 54 extends along the length L such that the minor sides 106, 108 converge as the minor sides 106, 108 extend toward the front end 34 and the major sides 110, 112 converge as the major sides extend toward the front end 34. An exterior shoulder 118 is defined between the front end portion 54 and the rear portion 52 to provide an exterior size reduction from the front portion 54 to the rear portion 116.

The rear portion 52 has a rectangular exterior shape and includes exterior ribs 120 at the major sides 110, 112. When the ferrule boot 14 has been fully inserted into the rear end of the ferrule 12 as shown at FIG. 2, the rear portion 52 projects rearwardly from the rear end of the ferrule 12 and the front portion 54 is pressed within the ferrule 12.

The interior of the ferrule boot 14 is configured to set the optical fibers 18 of the ribbon 16 at the second pitch corresponding to the pitch of the ferrule fiber openings 24. Thus, the interior of the ferrule boot 14 is configured for facilitating and implementing pitch conversion from the first fiber pitch of the ribbon 16 to the second pitch of the fiber openings 24. An interior of the front portion 54 defines an inner recess or slot 42 that is not divided into separate openings or regions and that has a cross-sectional shape that is elongate along the width W of the ferrule boot 14. The slot 42 can be configured with a slight taper such that the slot expands in the height orientation H orientation as the slot extends in a forward direction. An interior of the rear portion 52 is configured for providing fiber pitch conversion and is divided into a plurality of separate pitch conversion openings 28 (i.e., ferrule boot openings) that are parallel and that extend through the rear portion 52 from the rear end 32 of the boot 14 toward the front portion 54.

In the depicted example, the pitch conversion openings 28 define a pitch setting location 126 directly adjacent to the recess 42 defined by the front portion 54. At the pitch setting location 126, the pitch conversion openings 28 each preferably have a diameter that corresponds to the outer diameter of the coated fibers for which the pitch is being converted. For example, at the pitch setting location 126 the pitch conversion openings 28 can have diameters of about 200 microns, but since the ferrule boot 14 has an elastomeric construction, the boot can deform to accommodate size variations between the fibers and the fiber openings. At the pitch setting location 126, the pitch conversion openings 28 preferably have a center-center spacing to corresponds to the pitch of the fiber openings 24 of the ferrule 12 (e.g., about 250 microns). The pitch conversion openings 28 extend from the rear end 32 of the ferrule boot 14 to the pitch setting location 126. In one example, the pitch conversion openings 28 have a tapered configuration that constricts in size as the pitch conversion openings 28 extend in a forward direction along the length L. The tapered configuration can be adapted to facilitate inserting the fibers into the openings 28 by making the openings larger at the rear end 32 of the boot 14 as compared to at the pitch setting location 126. In one example, each opening 28 can include a taper such as a conical taper that converges as each of the openings extend from the rear end 32 to the pitch setting location 126. Thus, the openings 28 are tapered to narrow in cross-sectional area as the openings extend from the rear end 32 to the pitch setting location 126. Additionally, the pitch conversion openings 28 can include surrounding radii 13, (i.e., lead-in surface) directly at the rear end 32 of the boot 14 configured for further assisting guiding of the optical fibers 18 into the pitch conversion openings 28.

Figure 16:
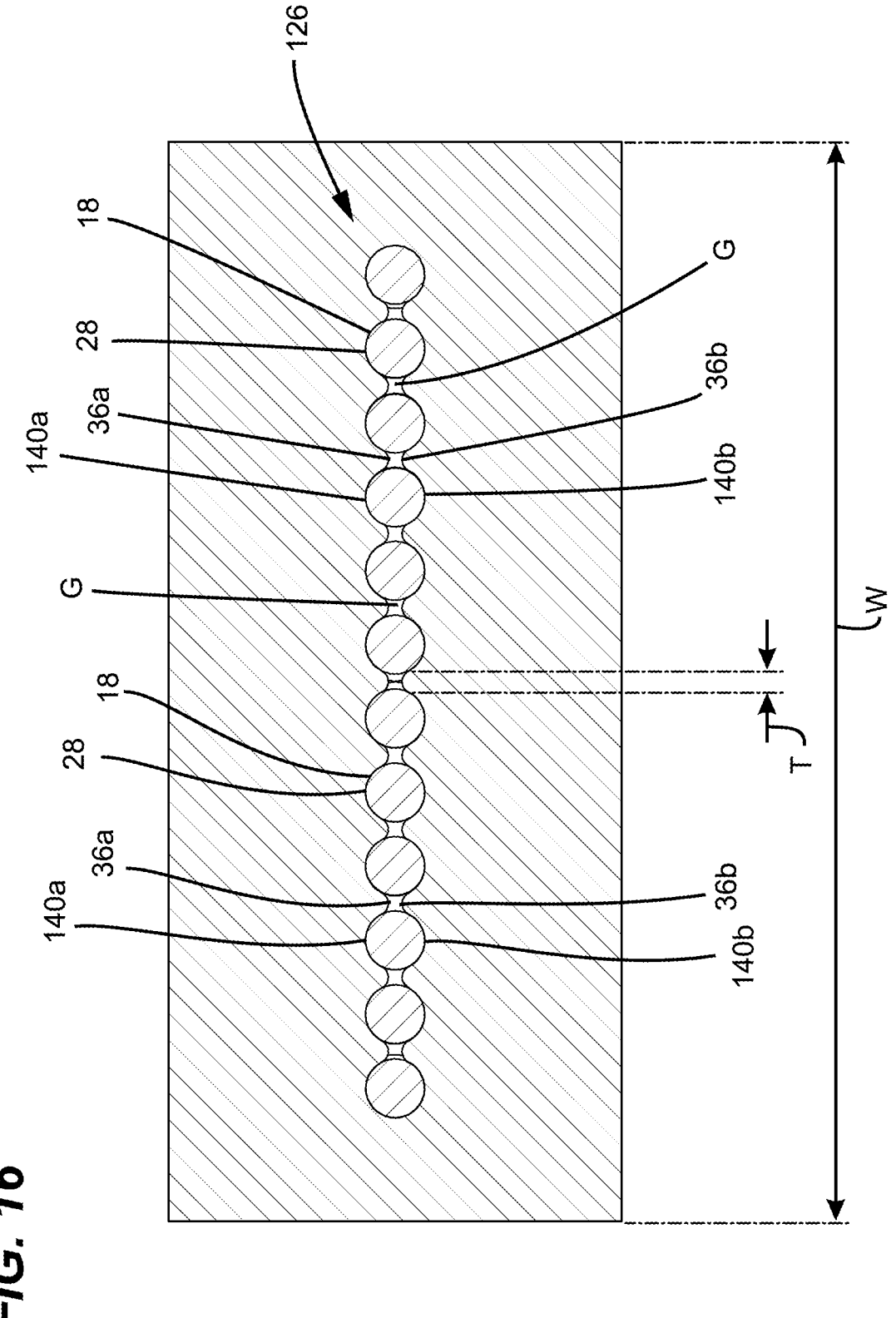
FIG. 16 is a cross-sectional view taken along section line 16-16 of FIG. 10 which corresponds to the pitch setting location of the ferrule boot.
Figure 17:
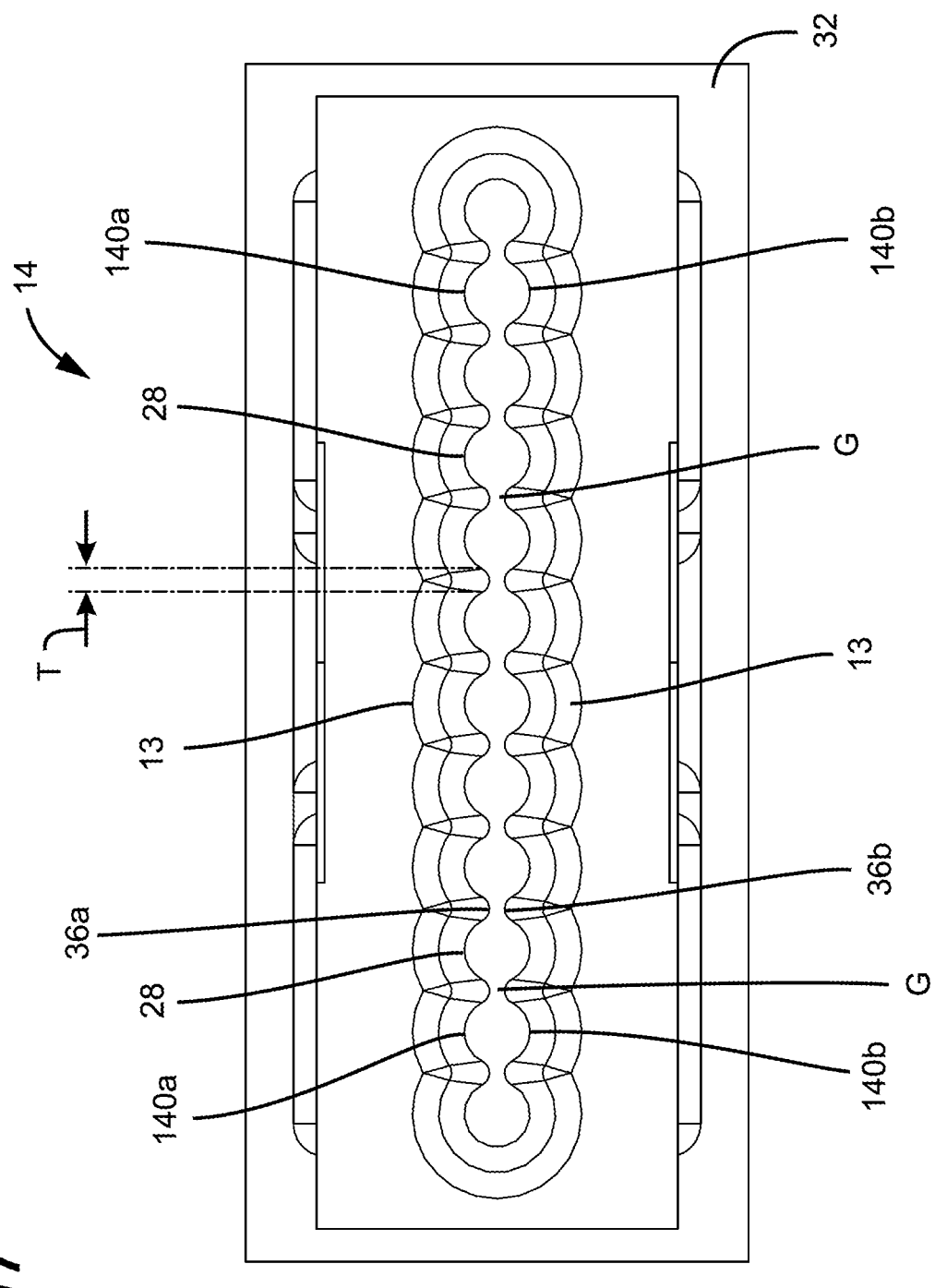
FIG. 17 is a rear end view of the ferrule boot with no optical fibers present in the ferrule boot.

In the depicted example, the pitch conversion openings 28 are not fully enclosed openings and are not completely separate from one another. For example, the pitch conversion openings 28 are defined by an upper set of curved recesses 140a and a lower set of curved recesses 140b (see FIG. 16). The curved recesses 140a, 140b are laterally (e.g., horizontally) separated by projections 36a, 36b that form parallel walls that extend along the length L of the boot 14 from the rear end 32 through the pitch setting location 126. Lower ends of the projections 36a oppose upper ends of the projections 36*b* and open gaps G (e.g., vertical gaps) are defined between the opposing upper and lower ends. The protections 36*a*, 36*b* have thicknesses T defined along the width W of the boot 14 that define lateral spacings required for providing pitch conversion from the first pitch to the second pitch. In one example, the thicknesses are about 50 microns and the openings 28 at the pitch setting location 126 have diameters of about 200 microns so that optical fibers having outer diameters of 200 microns can be arranged at a 250-micron pitch (i.e., a center-to-center spacing of 250 microns) within the openings 28 at the pitch setting location 126. The recesses 140*a*, 140*b* can include circular arc sections that curve about a center line of each opening 28. The arc sections can curve for less than 180 degrees about each center line or less than 160 degrees about each center line.

The ferrule boot fiber openings 28 of the ferrule boot 14 are arranged and configured to convert the first center-to-center spacing $S_1$ at the fiber ribbon 16 to the second center-to-center spacing $S_2$ to provide the optical fibers 18 with the desired second center-to-center spacing corresponding to the pitch of the fiber openings 24 of the ferrule 12 (e.g., a 250-micron pitch). The ferrule boot 14 functions as a tool to align the ends 26 of the optical fibers 18 within the ferrule fiber openings 24 of the multi-fiber ferrule 12. That is, when the front portion of the ferrule boot 14 is inserted within rear end of the multi-fiber ferrule 12, the ferrule boot fiber openings 28 of the ferrule boot 14 are coaxially aligned with the ferrule fiber openings 24 of the multi-fiber ferrule 12.

Figure 5:
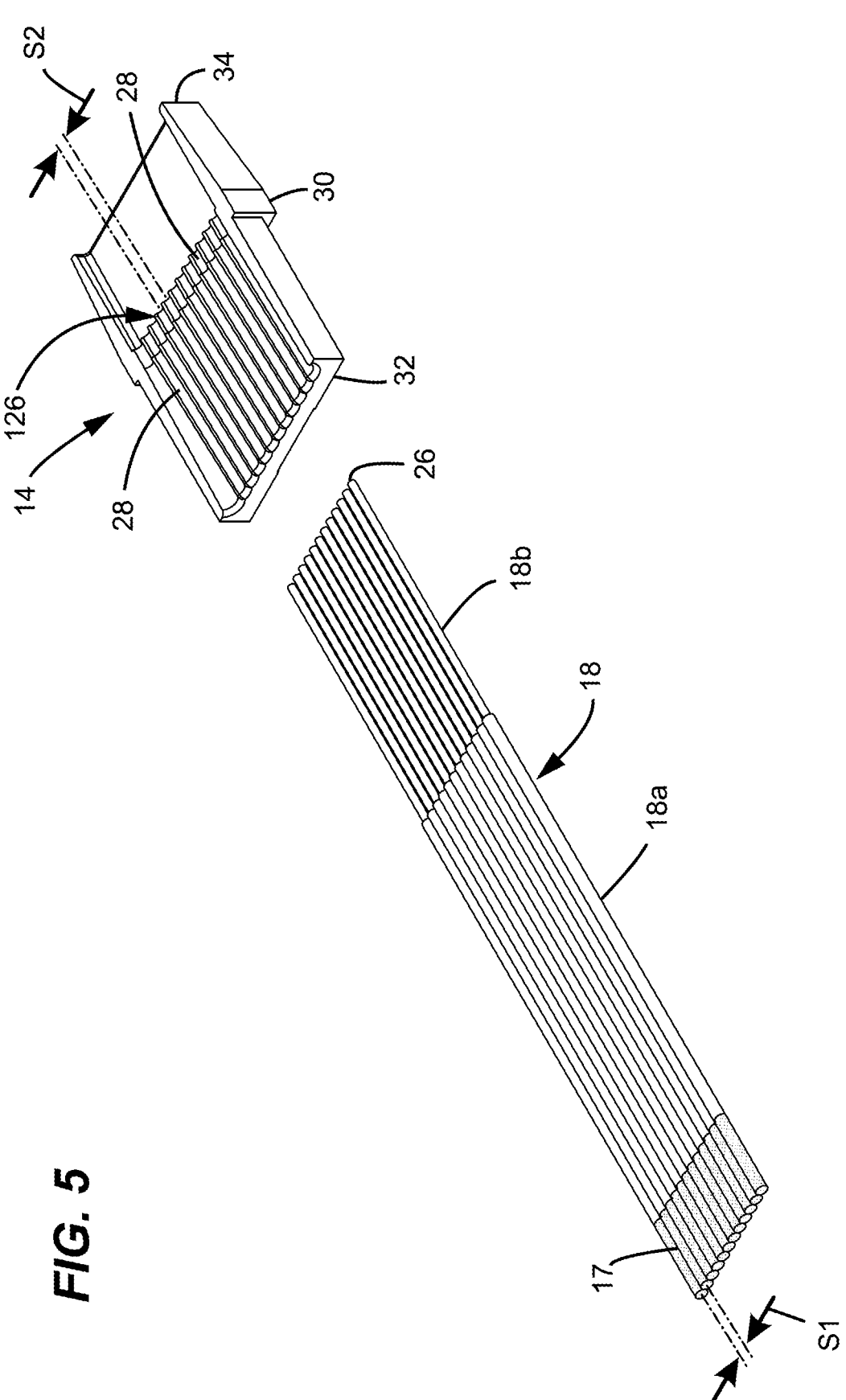
FIG. 5 is a perspective view showing a cutaway of the ferrule boot of FIG. 4 to show the ferrule boot fiber openings in accordance with the principles of the present disclosure.
Figures 6, 7:
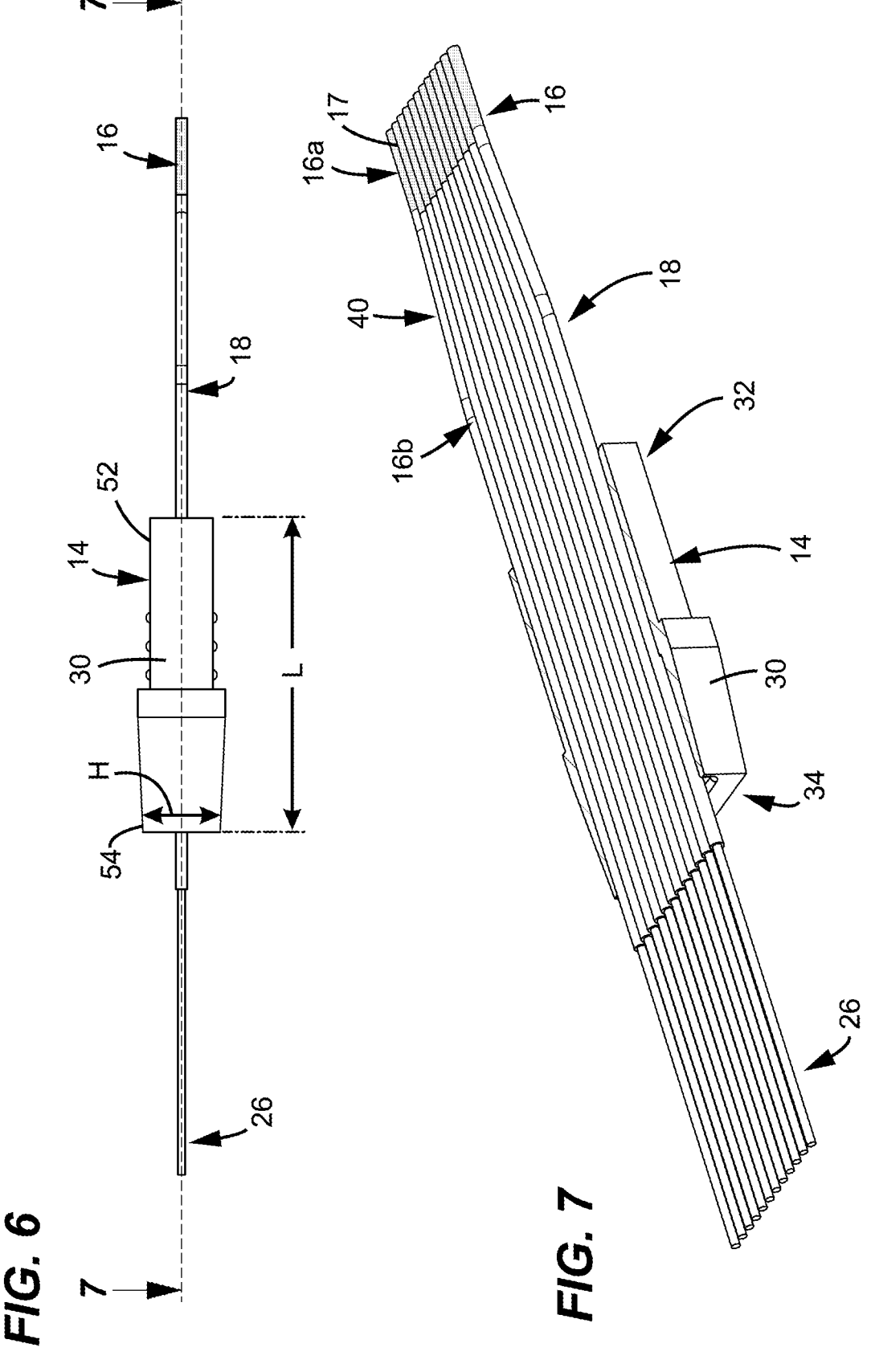
FIG. 6 is a side view of the ferrule boot of FIG. 1 including the optical fibers.
FIG. 7 is a partial cross-section view taken along section line 7-7 of FIG. 6.

Referring to FIG. 5, the ferrule boot 14 can be arranged and configured to establish a converted pitch for the coated optical fibers 18 of the ribbon 16 by receiving the coated optical fibers 18 within the ferrule boot fiber openings 28. The coated optical fibers 18 are de-ribbonized (i.e., the matrix material is removed or deconstructed) to allow the optical fibers 18 be laterally spread apart prior to entering the ferrule boot fiber openings 28. When entering the ferrule boot 14, the optical fibers 18 can be inserted into respective ferrule boot fiber openings 28 and the coated portions 18*a* of the de-ribbonized portion 16*b* of the ribbon 16 can be received within the pitch setting location 126 of the ferrule boot 14.

Although the ferrule boot 14 is configured to receive twelve optical fibers, it will be appreciated that ferrule boots in accordance with the principles of the present disclosure can be designed with different numbers of fiber passages to accommodate different numbers of fibers (e.g., 2, 4, 6, 8, 12, 16 or more fibers).

The fiber ribbon 16 can include a transition region 40 positioned behind the ferrule boot 14 where the optical fibers 18 transition from the first center-to-center spacing $S_1$ toward the second center-to-center spacing $S_2$. That is, the fiber ribbon 16 of optical fibers 18 can have a gradual transition region from the fiber ribbon 16 toward the rear end 32 of the ferrule boot 14. Thus, there can be a gradual transition between the optical fibers 18 from the first center-to-center spacing $S_1$ at the ribbonized portion 16*a* of the fiber ribbon 16 toward the second center-to-center spacing $S_2$ within the ferrule boot 14 and within the ferrule 12.

Figure 8:
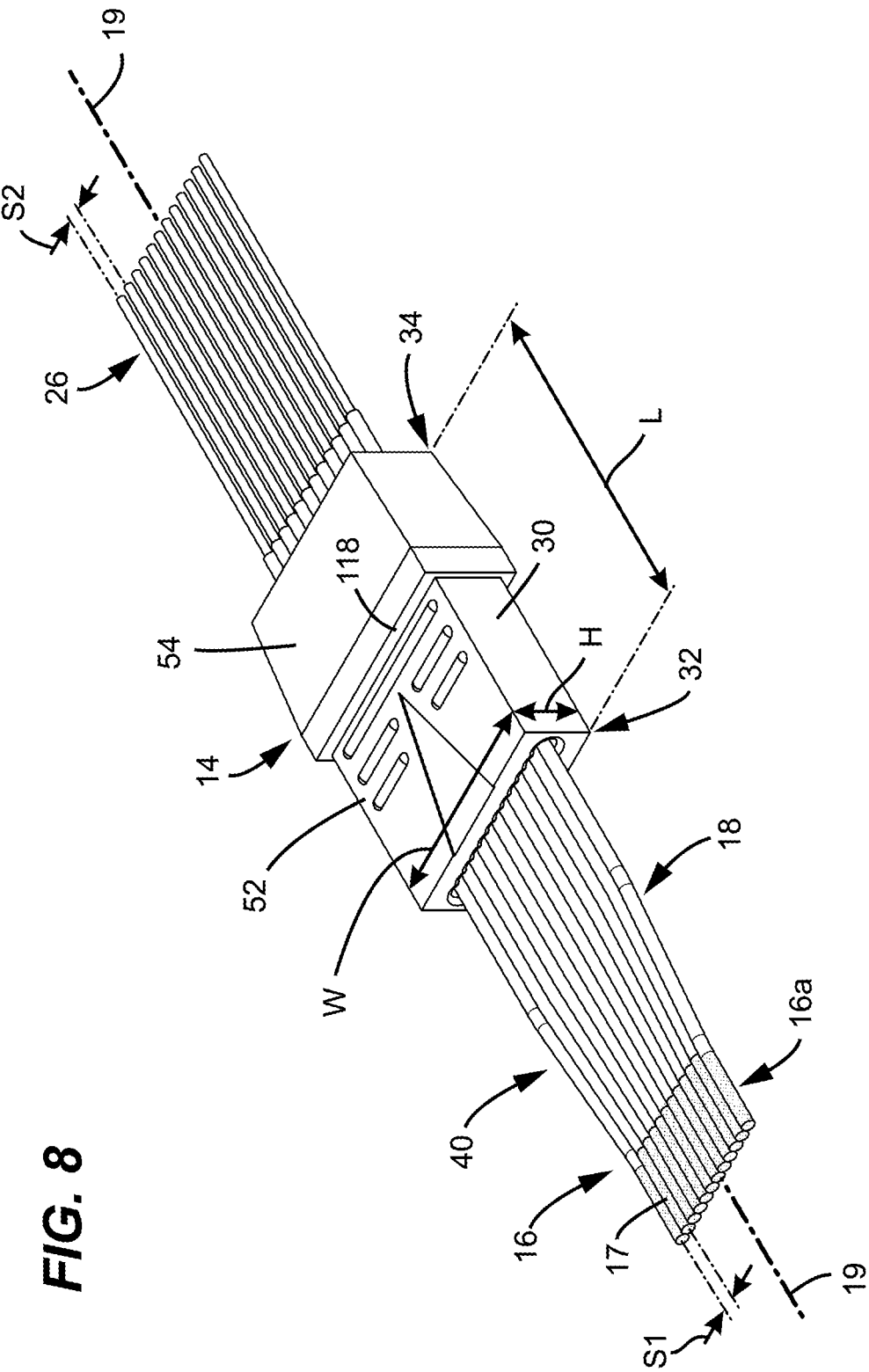
FIG. 8 is a perspective view of the ferrule boot and the optical fibers.
Figure 9:
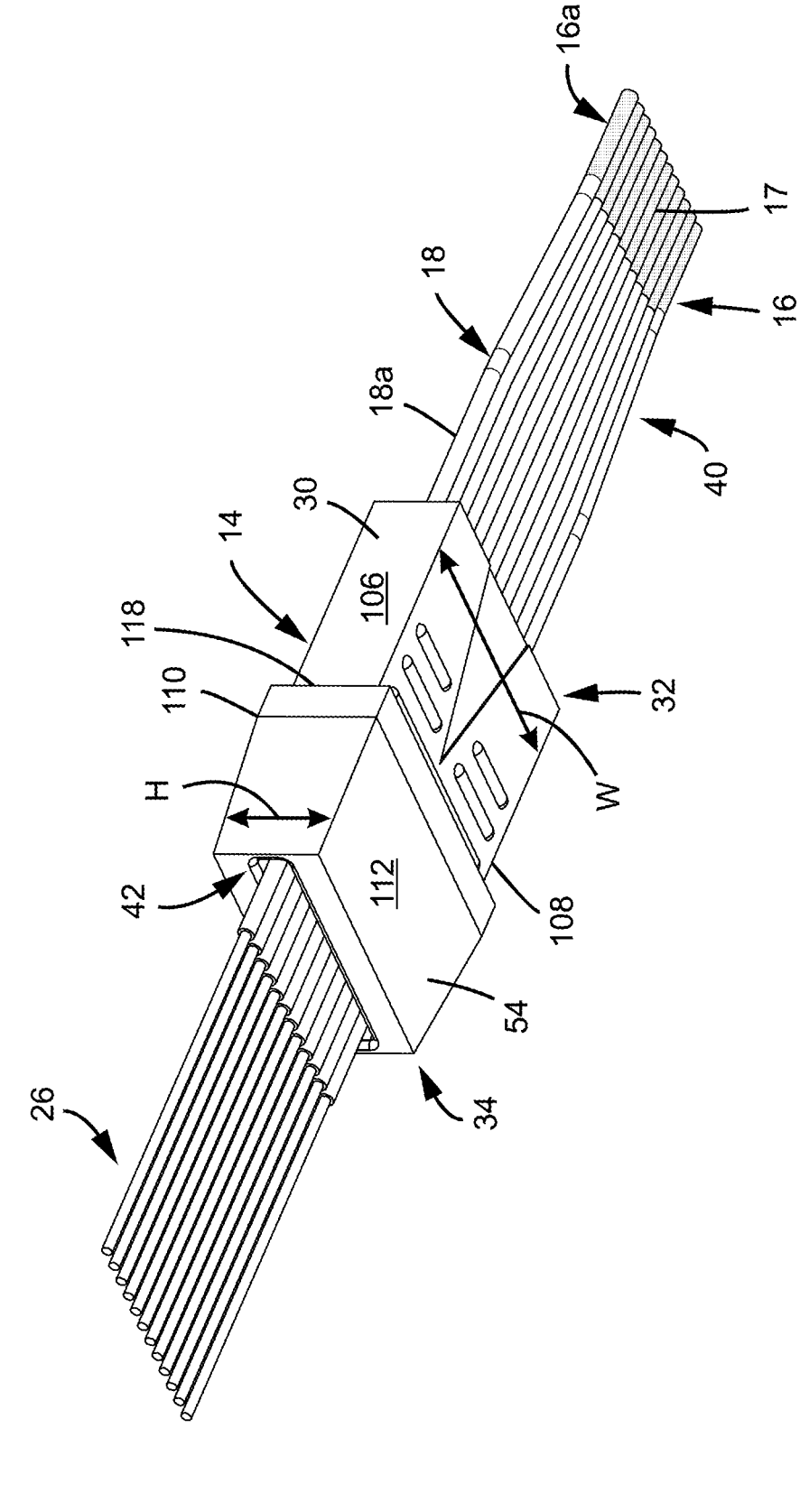
FIG. 9 is a bottom perspective view of the ferrule boot of FIG. 8.

Turning to FIGS. 8-9, the optical fibers 18 are shown inserted within the ferrule boot 14. The optical fibers 18 are positioned within the ferrule boot fiber openings 28 where the ferrule boot 14 converts the optical fibers' 18 pitch from about 200 microns to about 250 microns. The end portions 26 of the optical fibers 18 project forwardly from the slot 42 beyond the front end 34 of the ferrule boot 14.

Figure 10:
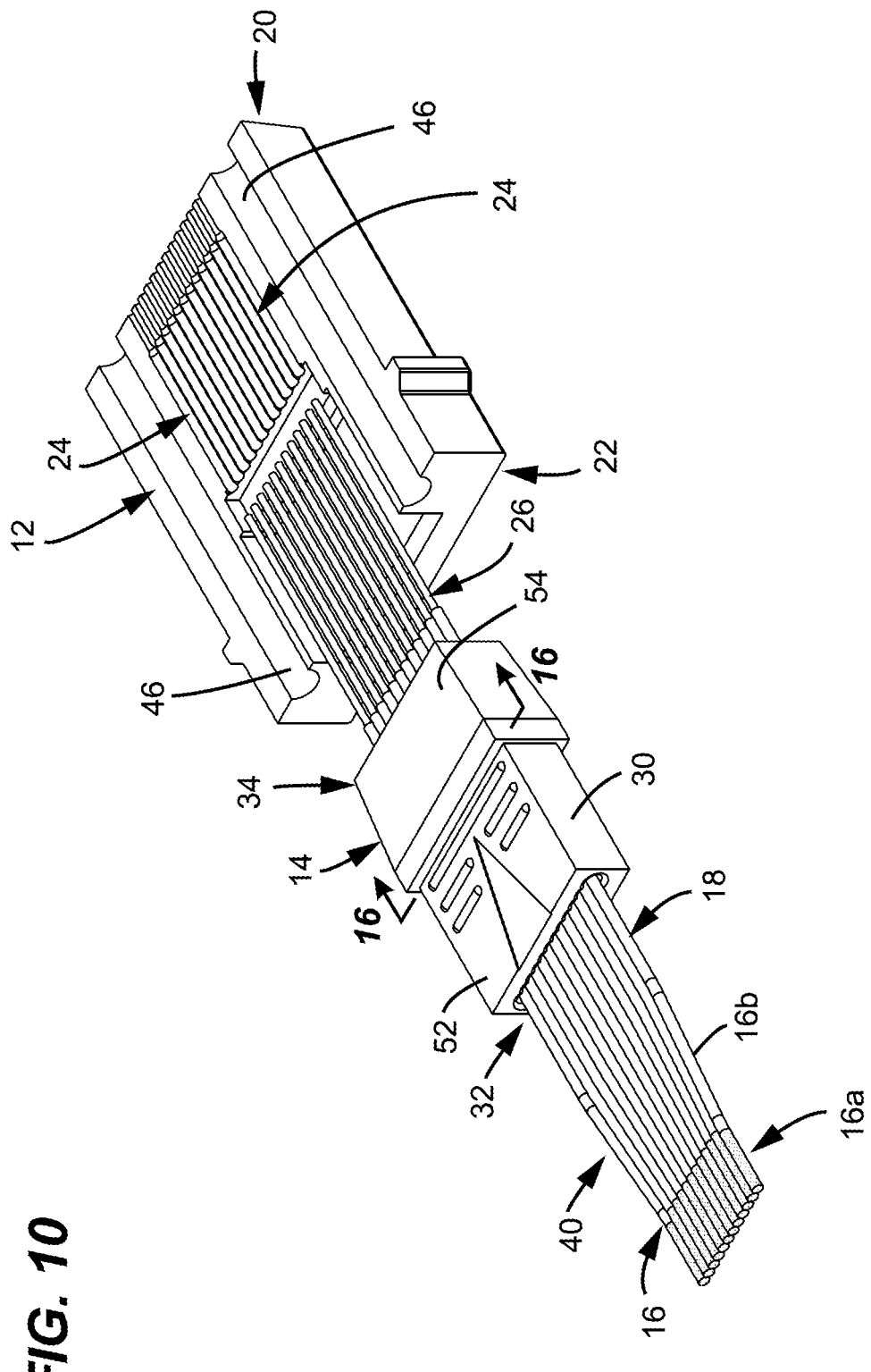
FIG. 10 is a perspective, partial cross-sectional view showing ferrule fiber openings of the multi-fiber ferrule and the optical fibers shown converted in pitch by the ferrule boot partially inserted into the multi-fiber ferrule.

FIG. 10 illustrates the ferrule boot 14 partially engaging the multi-fiber ferrule 12. As depicted, the ferrule boot 14 can function as an insertion tool to insert the end portions 26 of the optical fibers 12 extending out of the slot 42 of the ferrule boot 14 into the ferrule fiber openings 24 of the multi-fiber ferrule 12. The multi-fiber ferrule 12 can include a rectangular ferrule profile defining a major dimension F1 (see FIG. 3) and a minor dimension F2 (see FIG. 3) that are perpendicular relative to one another. The row (s) of end portions 26 of the optical fibers 18 extend along the major dimension F1. In other examples, more than one row of fiber openings 24 can be provided. In certain examples, each row can accommodate 12 optical fibers.

As used herein, the major dimension of a profile represents the largest dimension of the profile and the minor dimension represents the smallest dimension of the profile. Thus, the major dimension is longer than the minor dimension.

Turning again to FIGS. 1-2, while the description is directed towards MT optical ferrules, other ferrule types may be applicable as well. The multi-fiber ferrule 12 may be formed to have a rectangular cross-sectional shape and include an access opening 44 for receiving adhesive (e.g., epoxy). The optical fibers 18 may be fixed in place within the multi-fiber ferrule 12 by use of the adhesive that may be injected into the multi-fiber ferrule 12 via the access opening 44.

In certain examples, guide pin insertion holes 46 may be provided through the multi-fiber ferrule 12, extending from an end face 48 (see FIG. 3) out through the proximal end 22. Guide pins may be inserted into the guide pin insertion holes 46 for precise alignment of a pair of ferrules.

Figure 11:
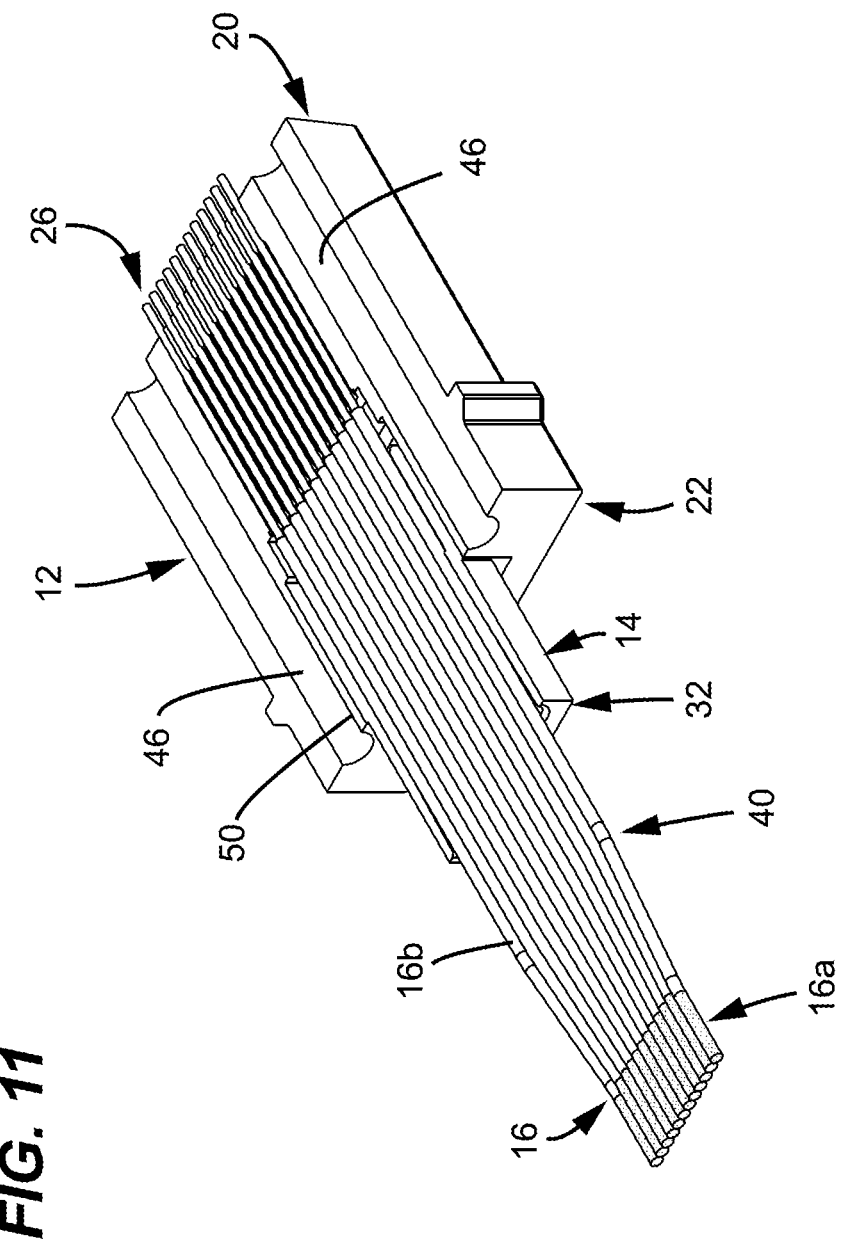
FIG. 11 is a perspective, partial cross-sectional view showing a portion of the ferrule boot mounted within the multi-fiber ferrule and the optical fibers inserted within the ferrule fiber openings in accordance with the principle of the present disclosure.
Figure 12:
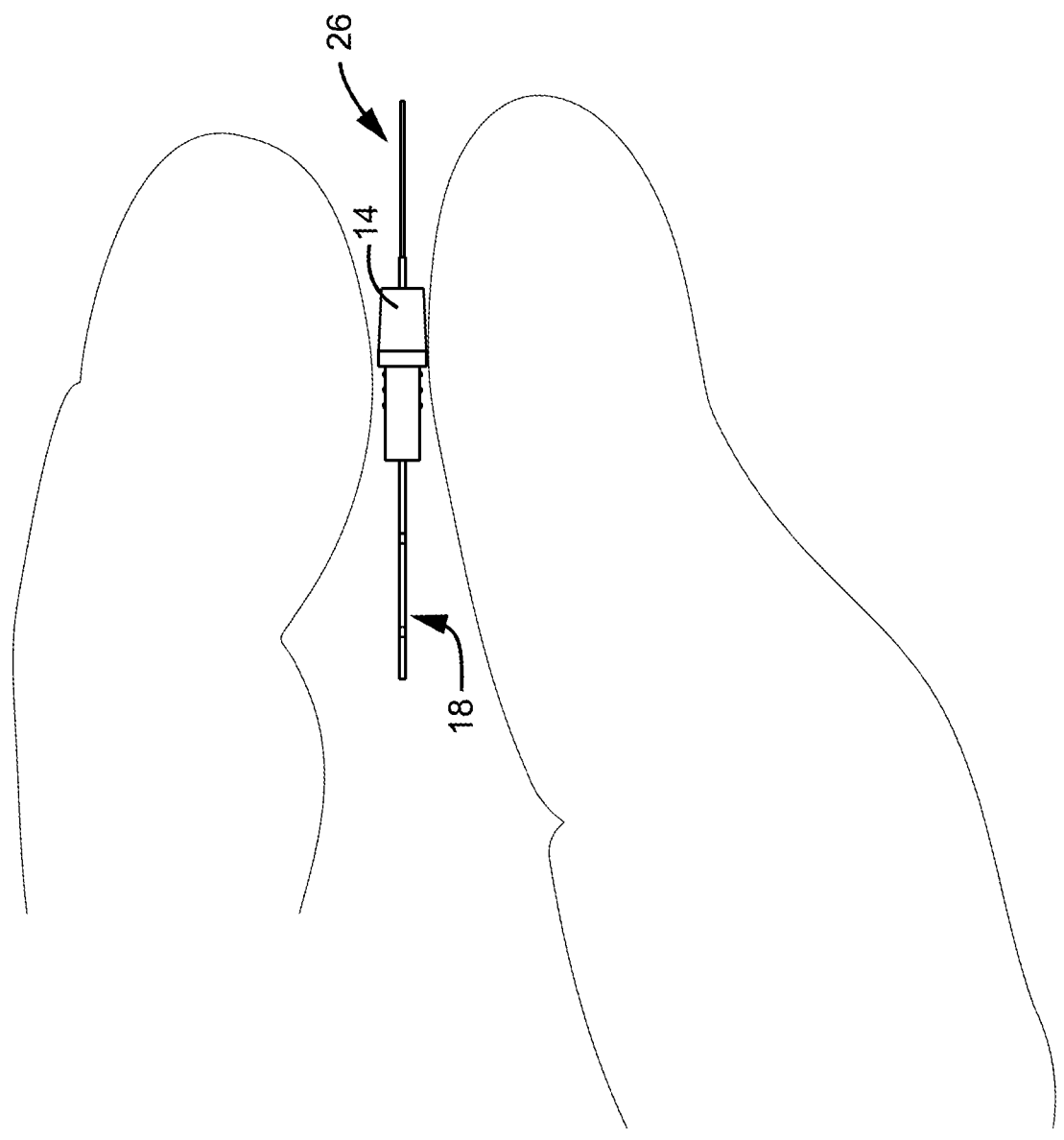
FIG. 12 is a view of a user holding the ferrule boot as a tool in preparation of inserting the optical fibers into the multi-fiber ferrule.
Figures 13, 14:
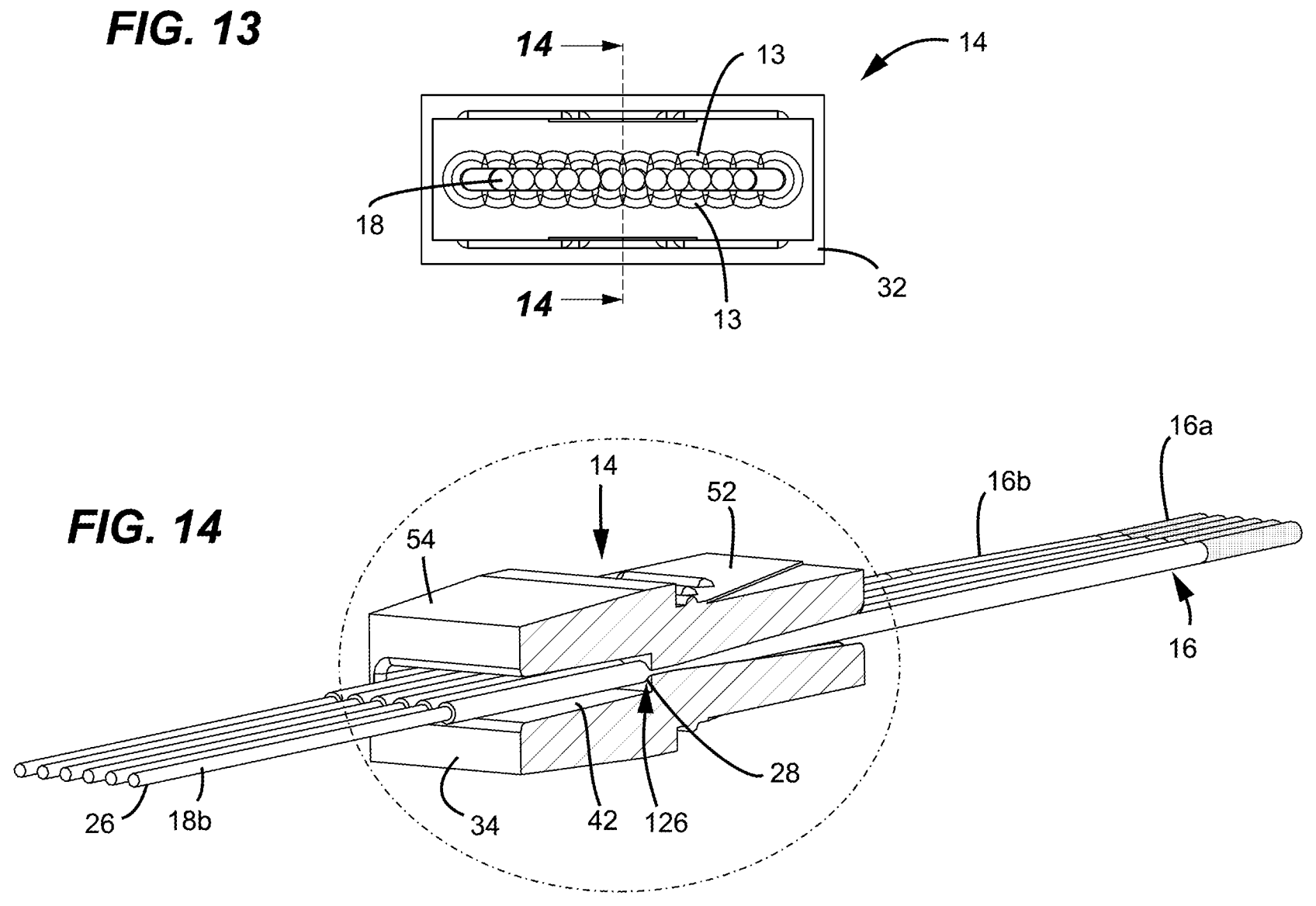
Figure 15:
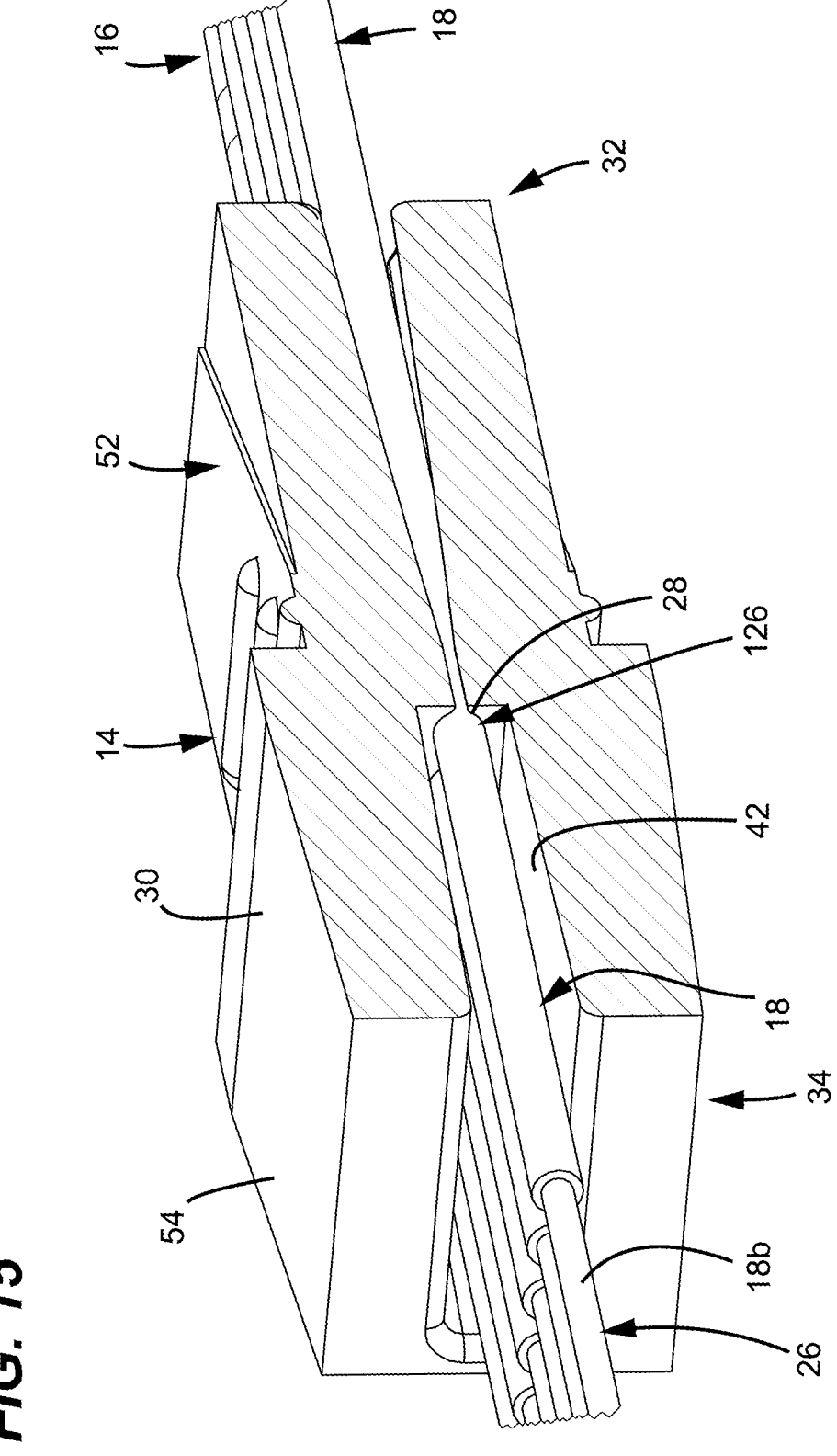
FIG. 15 is an enlarged view of a portion of FIG. 14.

FIG. 11 shows the ferrule boot 14 mounted within a rear opening 50 (see FIG. 1) of the multi-fiber ferrule 12 adjacent the proximal end 22 thereof. The ferrule boot 14 functions as a tool that allows a user to grasp (see FIG. 12) and insert the converted fiber pitch optical fibers 18 into the multi-fiber ferrule 12 such that the end portions 26 of the optical fibers 18 are arranged at the second center-to-center $S_2$ spacing within the multi-fiber ferrule 12. A rear end region 52 (see FIGS. 14-15) of the main body 30 can be squeezed in a direction perpendicular to the plane defined by the optical fibers (e.g., the outer major sides of the rear end region 52 of the ferrule boot 14 can be squeezed together) to assist in spreading the optical fibers 18 laterally within the boot 14 to ensure the fibers fit within their corresponding fiber locations 28 at the pitch setting location 126 of the ferrule boot 14 at the time the ferrule boot 14 is inserted into the multi-fiber ferrule 12. Proper positioning of the fibers 18 within the boot fiber openings 28 ensures the fibers are held at the pitch of the fiber openings 24 of the ferrule 12 thereby facilitating insertion of the fibers 18, 26 into the ferrule openings 24 as the ferrule boot 14 is inserted into the rear end 50 of the ferrule 12.

In certain examples, the front end 34 of the ferrule boot 14 may be tapered as described above to provide easier insertion and/or positive fit of a portion of the ferrule boot 14 within the multi-fiber ferrule 12.

Figure 18:
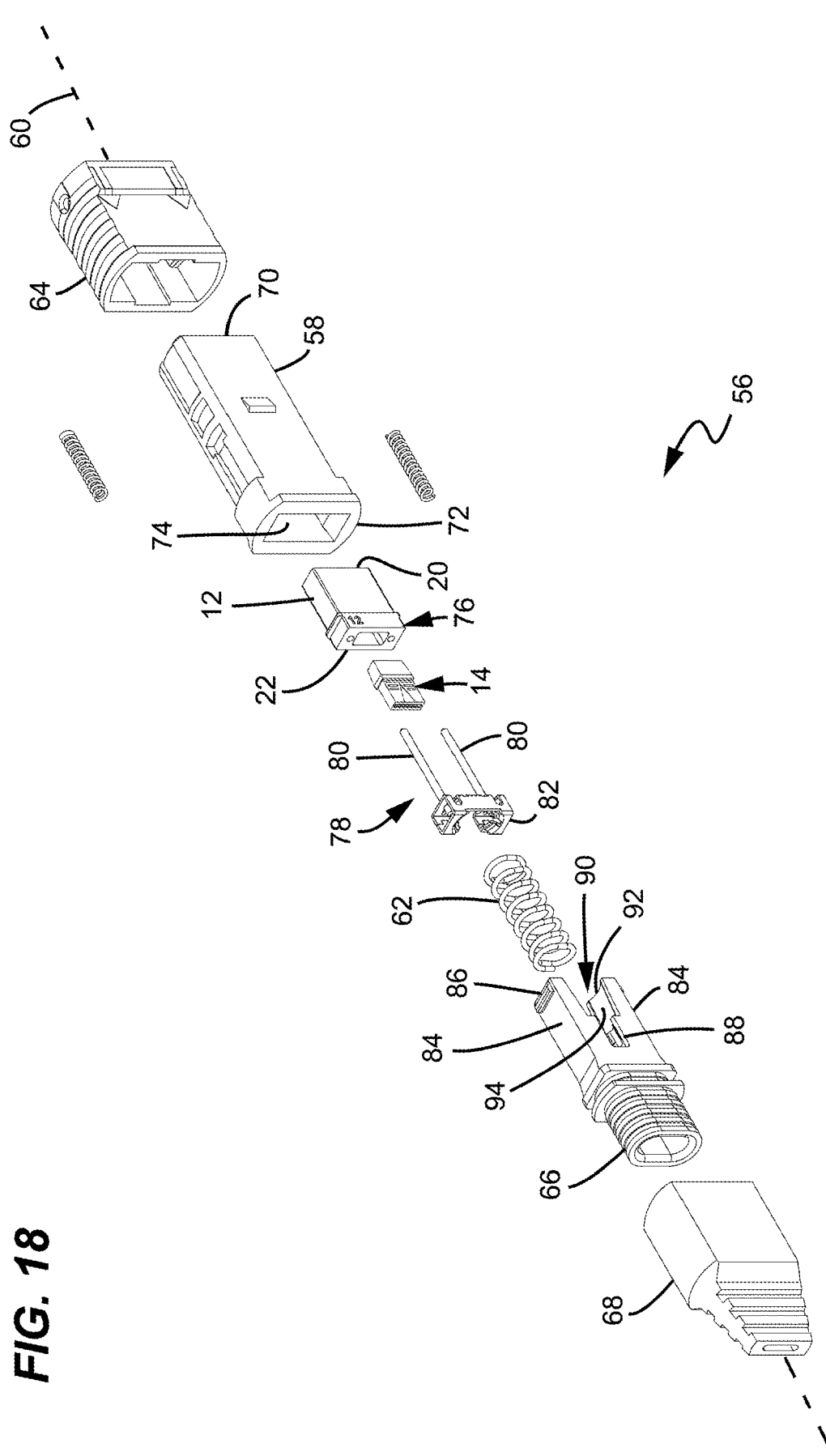
FIG. 18 is an exploded view of a multi-fiber fiber optic connector in accordance with the principles of the present disclosure.

Turning to FIG. 18, the fiber optic assembly 10 can be incorporated into a multi-fiber fiber optic connector 56. The multi-fiber fiber optic connector 56 includes a connector body 58 in which the multi-fiber ferrule 12 is mounted. The multi-fiber fiber optic connector 56 defines a longitudinal connector axis 60 (e.g., longitudinal central axis). The multi-fiber fiber optic connector 56 can include a spring 62 that biases the multi-fiber ferrule 12 in a distal direction relative to the connector body 58. The spring 62 can have a base end that is supported by and seated upon a spring stop of the multi-fiber fiber optic connector 56. When two of the multi-fiber fiber optic connectors 56 are connected together, the multi-fiber ferrules 12 are forced in a proximal direction against the bias of corresponding springs 62 and the ends of the optical fibers 18 are co-axially aligned with one another so that light signals can pass between the optical fibers 18.

The multi-fiber fiber optic connector 56 further includes a release sleeve 64, a spring push 66, and a connector boot 68. A dust cap (not shown) may mount over a distal end 70 of the connector body 58 and the spring push 66 loads into a proximal end 72 of the connector body 58. The release sleeve 64 is mounted on the connector body 58 and can slide over a limited range of movement in the distal-proximal orientation relative to the connector body 58. The release sleeve 64 can be spring biased in the distal direction and can be retracted from the distal position to release the multi-fiber fiber optic connector 56 from a mating fiber optic adapter (not shown). The connector boot 68 mounts over a proximal end of the spring push 66. As depicted, the connector body 58 can have an internal passageway 74 (e.g., ferrule passageway) having a length that extends along the longitudinal connector axis 60 from the distal end 70 to the proximal end 72.

A ferrule assembly 76 mounts within the internal passageway 74 of the connector body 58. The ferrule assembly 76 includes the multi-fiber ferrule 12. In certain examples, end faces of the optical fibers 18 are positioned at the distal end 20 of the multi-fiber ferrule 12. When the multi-fiber ferrule 12 is assembled within the connector body 58, the distal end 20 of the multi-fiber ferrule 12 is accessible at the distal end 70 of the connector body 58 so as to facilitate making an optical connection with another multi-fiber fiber optic connector. The ferrule assembly 76 further includes the ferrule boot 14 that mounts at the proximal end 22 of the multi-fiber ferrule 12. The ferrule boot 14 may be formed of an elastomeric material.

The ferrule assembly 76 further includes an alignment pin assembly 78. The alignment pin assembly 78 includes alignment pins 80 having base ends supported within a pin base 82. The alignment pins fit within the guide pin insertion holes 46 defined by the multi-fiber ferrule 12. The guide pin insertion holes 46 can be positioned on opposite sides of the rows of ferrule boot fiber openings 28. The pin base 82 mounts at the proximal end 22 of the multi-fiber ferrule 12. As so mounted, the alignment pins 80 project distally beyond the distal end 20 of the multi-fiber ferrule 12. Thus, the depicted ferrule corresponds to a "male" multi-fiber connector. In use, the alignment pins 80 are adapted to fit within corresponding pin openings defined by a mating female multi-fiber ferrule to provide alignment between the optical fibers of the mated ferrules. It will be appreciated that, in a female version of the multi-fiber ferrule 12, the pin base 82 can support shorter pins that extend only a relatively short distance distally into the guide pin insertion holes 46 such that distal portions of the guide pin insertion holes 46 are open.

The optical fibers 18 can form or be part of a cable to which the multi-fiber fiber optic connector 56 is mounted. For example, the optical fiber can by itself form the cable. In other examples, the cable can include the optical fibers and a protective jacket or sheath surrounding the optical fibers. In still other examples, the cable can include the optical fibers, a protective jacket and one or more strength members such as aramid yarn. The strength members can be coupled (e.g., crimped) to a proximal end of the spring push of the multi-fiber fiber optic connector 56. In certain examples, the cable can include a tube, the optical fibers, a protective jacket, and one or more strength members.

The spring 62 of the multi-fiber fiber optic connector 56 functions to bias the multi-fiber ferrule 12 in a distal direction relative to the connector body 58. When the multi-fiber fiber optic connector 56 is assembled, the spring 62 can be captured between the proximal end 22 of the multi-fiber ferrule 12 and the spring push 66. The spring push 66 may include a pair of latch arms 84 with latching tabs 86 that snap within corresponding receptacles defined within the connector body 58 when the spring push 66 is loaded into the proximal end 72 of the connector body 58. In this way, the latch arms 84 function to retain the spring push 66 at a fixed axial position within the internal passageway 74 of the connector body 58. The spring push 26 can include cut-out portions 88 that enhance the flexibility of the latch arms 84 to allow the latch arms 84 to flex together during insertion of the spring push 66 into the proximal end 72 of the connector body 58. When the spring push 66 is inserted fully in the connector body 58, the latch arms 84 snap outwardly to a retaining position in engagement with the connector body 58. As shown, the latch arms 84 cooperate to define a spring pocket 90 configured for receiving the spring 62. The spring pocket 90 has a profile with rounded ends 92 defined by opposing inner surfaces 94 of the latch arms 84.

In assembling the multi-fiber fiber optic connector 56, the optical fibers 18 can be processed to remove coating material from distal ends of the optical fibers 18 to provide bare fiber segments. The bare fiber segments are preferably bare glass that includes a core surrounded by a cladding layer. The bare fiber segments are bonded within the multi-fiber ferrule 12. That is, the bare fiber segments of the optical fibers 18 can be loaded into the multi-fiber ferrule 12 and secured with epoxy (e.g., adhesive) within the ferrule fiber openings 24. The distal end face of the multi-fiber ferrule 12 can then be processed by polishing or other means. After polishing, the alignment pin assembly 78 can be secured to the multi-fiber ferrule 12. The coated segments of the optical fibers 18 can be passed through the connector boot 68, the spring push 66, the spring 62 and the ferrule boot 14. In certain embodiments, the coating layer or layers can include a polymeric material such as acrylate having an outer diameter in the range of about 230-260 microns.

The ferrule assembly 76 and the spring 62 can then be loaded into the connector body 58 through the proximal end 72 of the connector body 58. Next, the spring push 66 is then snapped into the proximal end 72 of the connector body 58 to capture the spring 62 and the ferrule assembly 76 within the connector body 58. Thereafter, the connector boot 68 is pressed over the spring push 66.

Another aspect of the present disclosure relates to a method for assembling the optical fibers 18 of the fiber ribbon 16 within the ferrule fiber openings 24 of the multi-fiber ferrule 12. As described above, the optical fibers 18 include a first center-to-center spacing $S_1$ at the ribbonized portion of the fiber ribbon 16 and the ferrule fiber openings 24 have a second center-to-center spacing $S_2$ that is larger than the first center-to-center spacing $S_1$. The method includes the following steps: 1) de-coupling the optical fibers 18 from one another adjacent an end portion 26 of the fiber ribbon 16 such that a pitch diameter of the optical fibers 18 can be modified from the first center-to-center spacing $S_1$; 2) routing the end portions 26 of the optical fibers 18 through the ferrule boot fiber openings 28 which are arranged at the second center-to-center spacing $S_2$; and 3) inserting the end portions 26 of the optical fibers 18 into the ferrule fiber openings 24 while the optical fibers 18 are maintained at the second-center-to-center spacing S₂ by the ferrule boot 14.

FIG. 19 is a flow chart illustrating an example method 100 of making a fiber optic assembly 10. In this example, the method 100 includes operations 101, 102,104, 106, 108, 110, 112, and 114.

Initially, at operation 101, the connector boot 68, the spring push 66, the spring 62 and the ferrule boot 14 are inserted over the fiber ribbon 16.

The operation 102 is then performed to separate or remove or otherwise deconstruct the matrix ribbon material 17 between the optical fibers 18 such that the optical fibers 18 are independently movable.

The operation 104 is performed to place the optical fibers 18 into a stripping tool to remove the coating layer.

The operation 106 is performed to clean the optical fibers 18 after stripping by using a cleaning fluid.

The operation 108 is performed to slide the ferrule boot 14 up to at least within 10 mm of the coated fibers 18 and apply slight pressure to the major sides of the rear portion of the ferrule boot 14 to spread the optical fibers within the boot 14 such that the fibers move to their corresponding pitch conversion openings 28 at the pitch conversion location 126 to provide a pitch conversion from a first pitch of about 200 micrometers to a second pitch which of about 250 microm-eters.

The operation 110 is performed to insert the ferrule boot 14 into the multi-fiber ferrule 12. The ferrule boot 14 is used as a tool to guide the converted pitched optical fibers 18 into the multi-fiber ferrule 12. A user may use fingers to keep slight pressure on the major sides of the ferrule boot 14 during insertion to maintain the converted pitch and/or can pinch the major sides of the ferrule boot together to ensure the optical fibers are spread apart into their appropriate boot fiber openings 28 at the pitch setting location 26 during the insertion process to assist in effective fiber insertion into the ferrule openings. In certain examples, the pinch pressure manually applied to the major sides ferrule boot can be varied to slightly manipulate the spacing of the fibers during the insertion process until the user feels the optical fibers slide easily into the ferrule openings.

The operation 112 is performed to dispense epoxy into the ferrule through the access opening 44 of the multi-fiber ferrule 12 to pot the optical fibers 18 within the multi-fiber ferrule 12. The ferrule boot 14 provides strain relief and helps to prevent epoxy resin from flowing out of the multi-fiber fiber optic connector 56.

The operation 114 is performed to cure the epoxy. The remainder of the connector parts are then assembled in place with respect to the ferrule 12.

Figure 20:
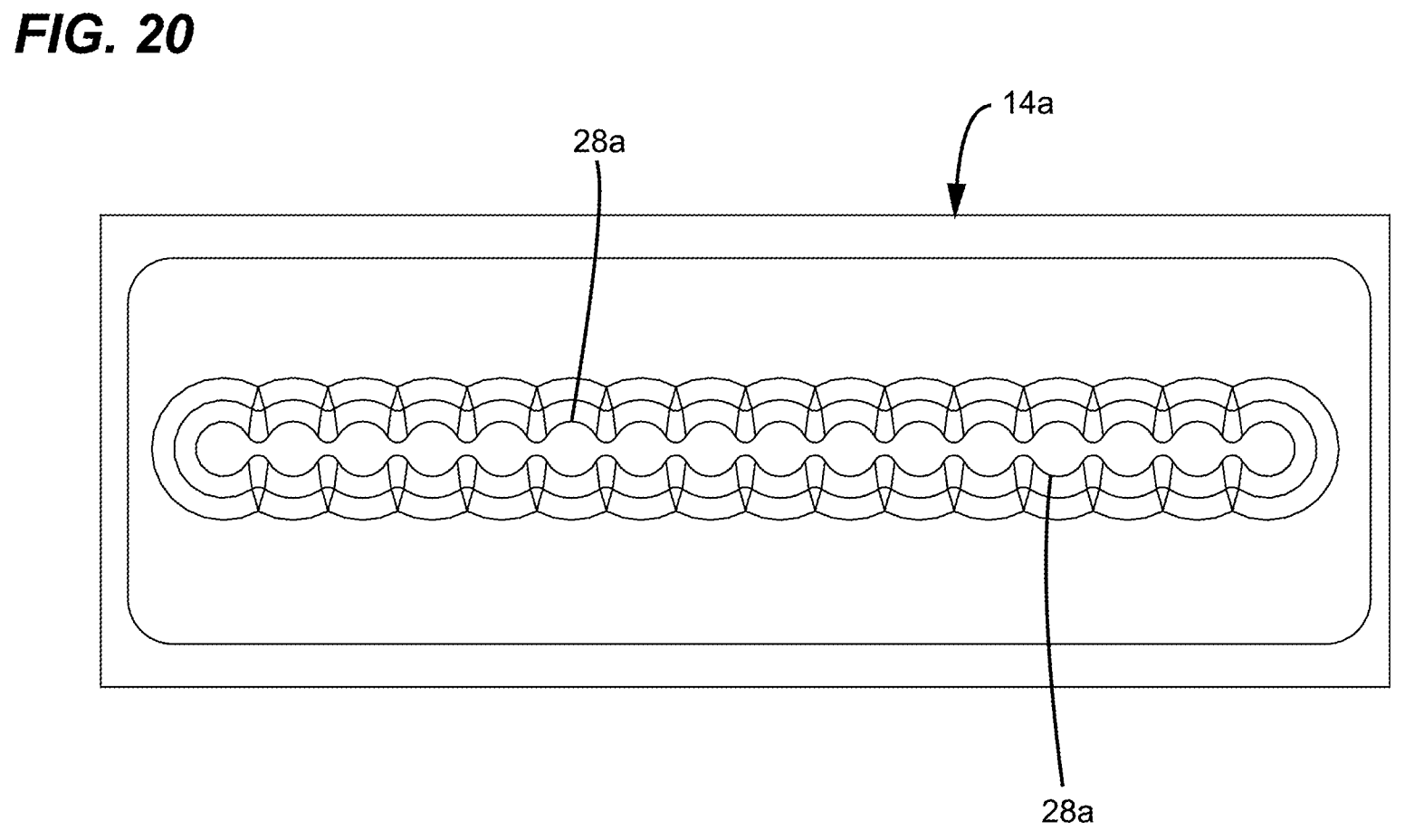

FIG. 20 is a rear end view of an alternate example of a ferrule boot 14a in accordance with the principles of the present disclosure. The ferrule boot 14a has the same construction as the ferrule boot 14 except the ferrule boot 14a has sixteen ferrule boot openings 28a configured for converting the pitch of the optical fibers of a 16-fiber optical ribbon to a larger pitch of a 16-fiber multi-fiber ferrule. In one example, the ferrule boot openings 28a each have a diameter of about 200 microns and a center-to-center spac-ing of about 250 microns. In one example, the fiber ribbon can have a uniform center-to-center fiber spacing (e.g., about 200 microns) and the ferrule boot openings can have an average center-to-center spacing greater than the center-to-center spacing of the fibers of the fiber ribbon. In one example, the average center-to-center spacing of the ferrule boot openings 28a is equal to the center-to-center spacing of the fiber openings of the multi-fiber ferrule. In one example, the ferrule boot openings 28a and the fiber openings of the multi-fiber ferrule have center-to-center spacings that are about equal and are uniform across all the openings.

Figure 21:
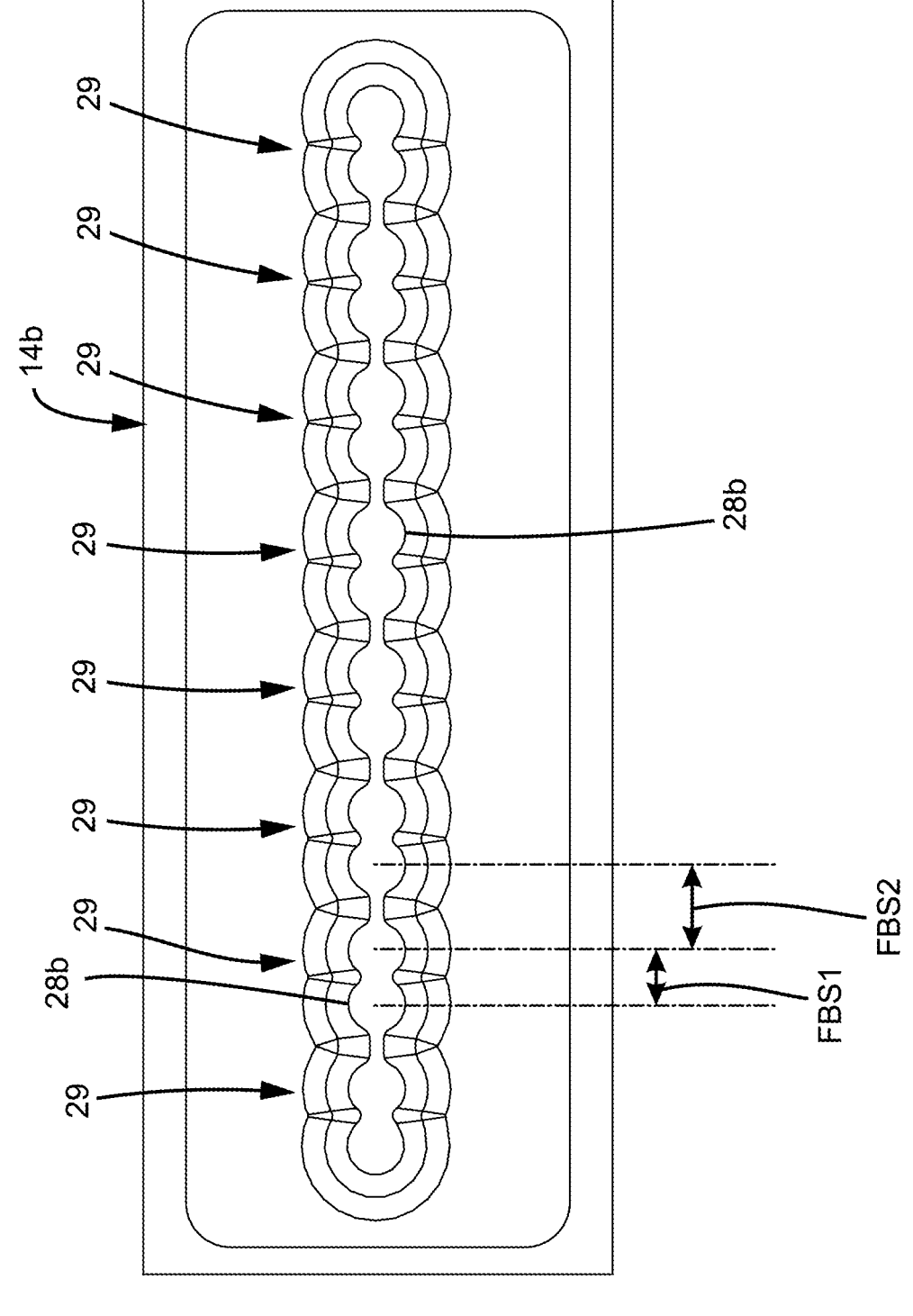
FIG. 21 is a rear end view of an alternate example of a ferrule boot in accordance with the principles of the present disclosure configured for facilitating inserting the fibers of a fiber ribbon with paired fibers into uniformly spaced fiber openings of a multi-fiber ferrule.

FIG. 21 is a rear end view of another alternate example of a ferrule boot 14b in accordance with the principles of the present disclosure. The ferrule 14b boot can have the same construction as the ferrule boot 14 except the ferrule boot 14b has ferrule boot openings 28b configured for facilitating inserting the fibers of a fiber ribbon with paired fibers into uniformly spaced fiber openings of a multi-fiber ferrule. In one example, the fiber ribbon can include 16 fibers separated into 8 fiber pairs. The optical fibers of each of the fiber pairs can be connected by continuous matrix material and the fibers of adjacent pairs of optical fibers can be connected by intermittent portions of matrix material. The ferrule boot 14b can defines a row of ferrule boot fiber openings 28b arranged in pairs 29 of the ferrule boot openings 28b. The ferrule boot openings 28b of each pair 29 of ferrule boot openings 28b are separated by a first boot opening center-to-center spacing FBS1. The ferrule boot openings 28b of adjacent ones of the pairs 29 of ferrule boot openings 28b are separated by a second boot opening center-to-center spacing FBS2 that is larger than the first boot opening center-to-center spacing FBS1. In one example, the first boot opening center-to-center spacing FBS1 is about 200 microns, and the second boot opening center-to-center spacing FBS2 is about 300 microns. In one example, the ferrule boot openings 28b each have a diameter of about 200 microns. In one example, the fiber ribbon can have a uniform center-to-center spacing (e.g., about 200 microns) and the ferrule boot openings 28b can have an average center-to-center spacing that is greater than the center-to-center spacing of the fiber ribbon. In one example, the fiber openings of the multi-fiber ferrule all have about the same center-to-center spacing (e.g., about 250 microns) and the average center-to-center spacing of the ferrule boot openings 28b is less than or equal to the center-to center spacing of the fiber openings of the multi-fiber ferrule.

Figure 22:
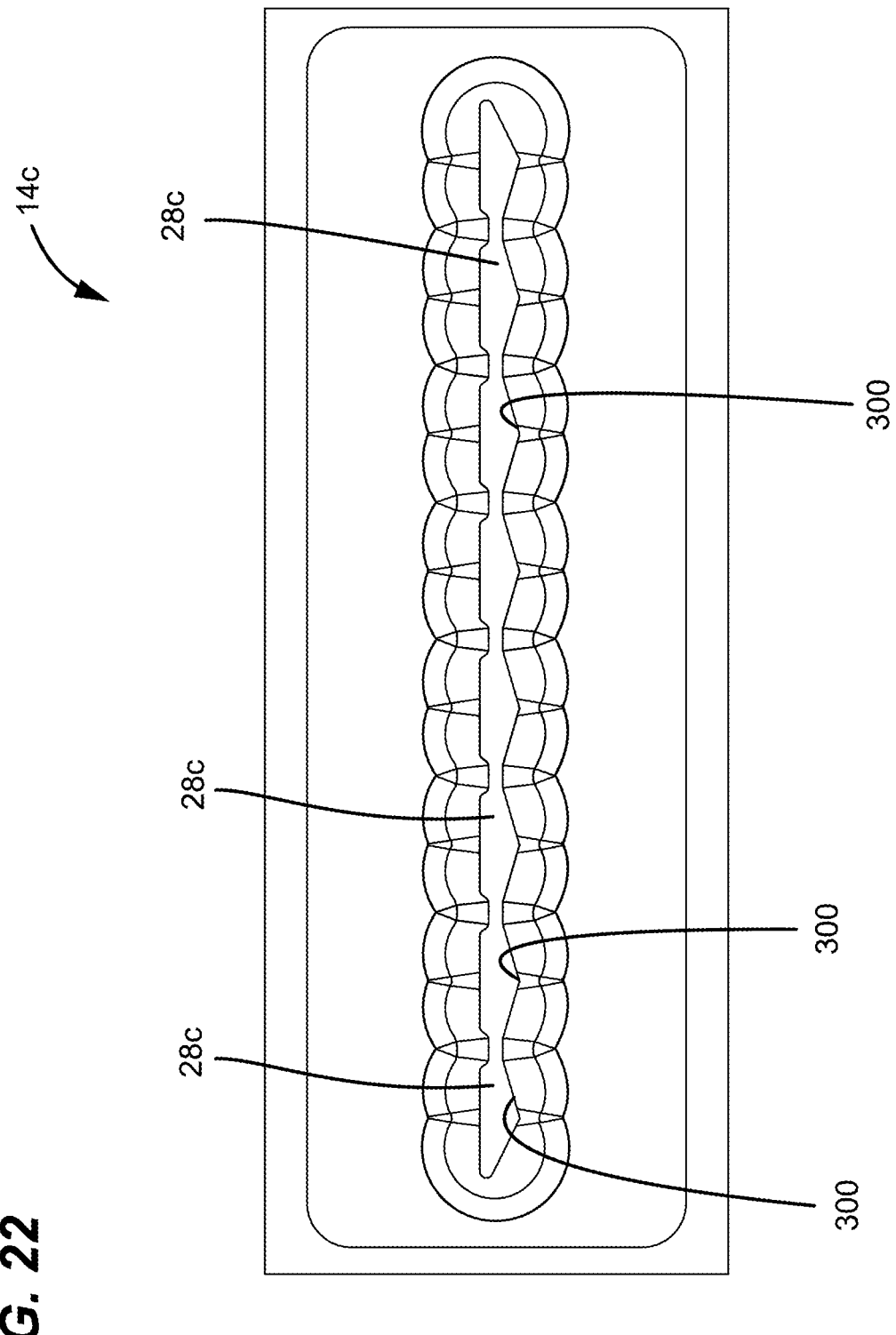
FIG. 22 is a rear end view of another alternate example of a ferrule boot in accordance with the principles of the present disclosure configured for facilitating inserting the fibers of a fiber ribbon with paired fibers into uniformly spaced fiber openings of a multi-fiber ferrule.
Figure 23:
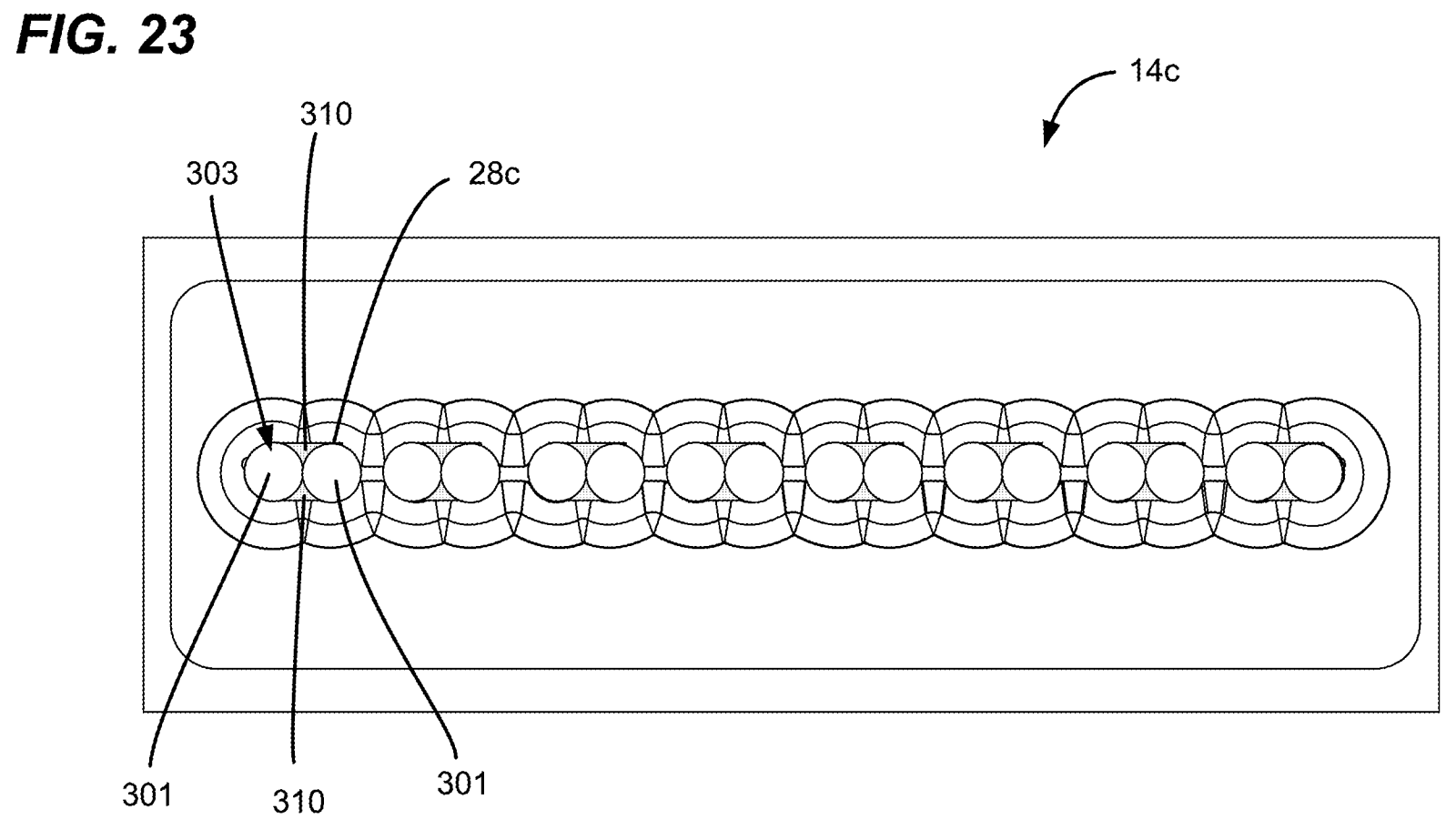
Figure 24:
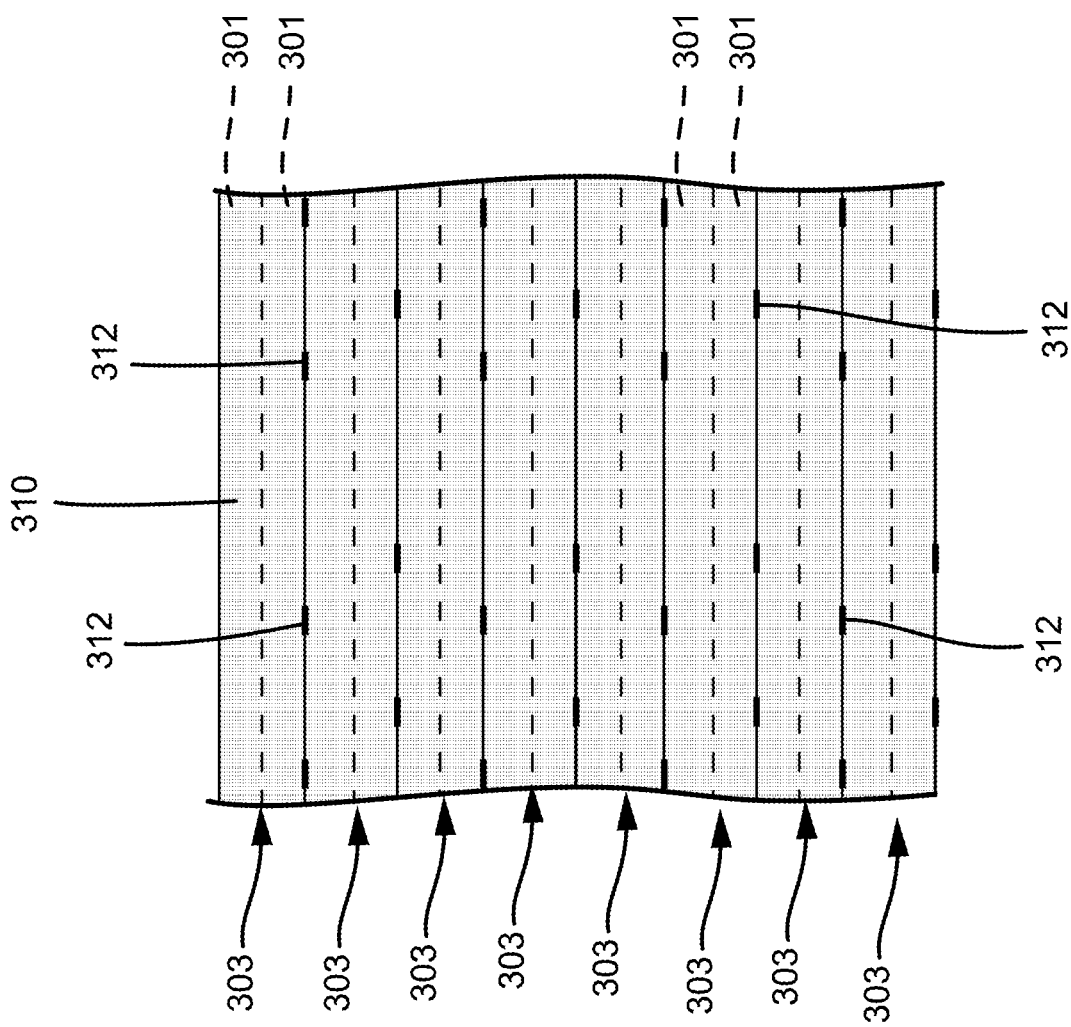
FIG. 24 is a top plan view of a fiber ribbon having fiber pairs connected to one another at intermittent bonding locations.

FIG. 22 is a rear end view of another alternate example of a ferrule boot 14c in accordance with the principles of the present disclosure having a construction suitable for spacing optical fibers to facilitate inserting the optical fibers into a ferrule. Similar to previous examples, the ferrule boot 14c can assist in providing pitch conversion. The ferrule 14c boot can have the same construction as the ferrule boot 14 except the ferrule boot 14c has an alternative configuration of ferrule boot openings 28c configured for facilitating inserting the fibers of a fiber ribbon with paired fibers into uniformly spaced fiber openings of a multi-fiber ferrule. In one example, the fiber ribbon can include 16 fibers 301 separated into 8 fiber pairs 303 (see FIGS. 23 and 24). The optical fibers 301 of each of the fiber pairs 303 can be connected by continuous matrix material 310 and the fibers 301 of adjacent pairs of optical fibers can be connected by intermittent portions of matrix material 312. The ferrule boot 14c can defines a row of ferrule boot fiber openings 28c including grooves 300 (e.g., v-grooves) each configured for receiving one of the fiber pairs 303. Thus, two fibers 301 are received in each of the grooves 300. In one example, the fiber ribbon can have a uniform center-to-center spacing (e.g., about 200 microns). In one example, the fiber openings of the multi-fiber ferrule all have about the same center-to-center spacing (e.g., about 250 microns). Alternative boots can have different numbers of grooves 300 to correspond to fiber ribbons having different numbers of fiber pairs. For example, a boot for a ribbon having six pairs of fibers would have six of the grooves 300.

It will be appreciated that the grooves 300 can be incorporated into other fiber handling tools such as clips or other fiber handling devices used to separate the fibers of fiber ribbons having paired fibers. In such examples, the fiber pairs are routed into separate grooves such that two fibers are located in each groove. The handling tools can be used to separate the fibers to provide a fiber presentation that facilitates the insertion of the optical fibers into the fiber openings of a multi-fiber ferrule and to provide pitch conversion (e.g., a 200 micron pitch to a 250 micron pitch). The handling tools can be used to separate the fibers to provide a fiber presentation (e.g., a pitch conversion) that facilitates the insertion of the optical fibers into a fusion splicing machine. The handling tools can be used to separate the fibers to provide a fiber presentation that facilitates the insertion of the optical fibers into a cleaving machine or a cleaning machine or a stripping machine. In the case of a clip, the grooves can be integrated into a base of the clip and the clip can include a pivotal cover pivotally connected to the base that is closed to retain the pairs of fibers in their respective grooves. At an end portion of the fiber ribbon received within the tool and projecting as a free end portion beyond the tool, the intermittent bonds between the fiber pairs can be broken before or during loading of the fiber pairs into the grooves. In certain examples, the continuous matrix material (e.g., acrylate) bonding the fibers of the fiber pairs together as wall as other fiber coatings can be removed (e.g., by stripping) from the free end portion of the fiber ribbon that projects beyond the tool before or after the fibers have been loaded into the fiber handling tool. The stripped free ends can appear similar to the stripped free end portions of the fibers projecting from the ferrule boot shown at FIGS. 8 and 9). The continuous matrix material that bonds between the fibers of each fiber pair can remain intact for the portions of the optical fiber pairs received in the grooves. The intermittent bonds between adjacent fiber pairs can be broken along the lengths of the portions of the optical fiber pairs received in the grooves and the lengths of the optical fiber pairs that project outwardly beyond the grooves. In the case of a ferrule boot, the tool can have a resilient construction (e.g., an elastomeric rubber construction). In the case of a clip, the base defining the grooves can have a more rigid construction such as metal.

EXAMPLE ASPECTS OF THE DISCLOSURE

Aspect 1. A fiber optic assembly comprising:

a fiber ribbon including a plurality of optical fibers maintained at a first center-to-center spacing;

a multi-fiber ferrule including a front end and a rear end, the multi-fiber ferrule including a row of ferrule fiber openings adjacent the front end of the ferrule, the ferrule fiber openings being arranged at a second center-to-center spacing that is larger than the first center-to-center spacing, the plurality of optical fibers having end portions secured within the ferrule fiber openings such that the end portions of the plurality of optical fibers are arranged at the second center-to-center spacing within the multi-fiber ferrule; and a ferrule boot secured within the multi-fiber ferrule adjacent the rear end of the ferrule, the ferrule boot defining a row of ferrule boot fiber openings arranged at the second center-to-center spacing, the plurality of optical fibers being arranged to extend through the ferrule boot fiber openings.

Aspect 2. The fiber optic assembly of aspect 1, wherein the fiber ribbon is a rollable fiber ribbon.

Aspect 3. The fiber optic assembly of aspect 1, wherein the first center-to-center spacing is about 200 microns and the second center-to-center spacing is about 250 microns.

Aspect 4. The fiber optic assembly of any of aspects 1-3, wherein the fiber ribbon includes a transition region positioned behind the ferrule boot where the plurality of optical fibers transition from the first center-to-center spacing toward the second center-to-center spacing.

Aspect 5. The fiber optic assembly of aspect 4, wherein the ferrule boot fiber openings have diameters smaller than the second center-to-center spacing.

Aspect 6. The fiber optic assembly of aspect 5, wherein the multi-fiber ferrule defines a window for receiving epoxy to secure the end portions of the plurality of optical fibers within the ferrule fiber openings.

Aspect 7. The fiber optic assembly of any of aspects 5-6, wherein the ferrule boot fiber openings of the ferrule boot include a taper to help funnel the plurality of optical fibers to the second center-to-center spacing, wherein the ferrule boot fiber openings neck down as the ferrule boot fiber openings extend towards a front end of the ferrule boot.

Aspect 8. A method for assembling optical fibers of a fiber ribbon within ferrule fiber openings of a multi-fiber ferrule, the optical fibers including a first center-to-center spacing at a ribbonized portion of the fiber ribbon, the ferrule fiber openings having a second center-to-center spacing that is larger than the first center-to-center spacing, the method comprising:

de-coupling the optical fibers from one another adjacent an end portion of the fiber ribbon such that a pitch of the optical fibers can be modified from the first center-to-center spacing;

routing end portions of the optical fibers through ferrule boot fiber openings of a ferrule boot, the ferrule boot fiber openings being arranged at an average center-to-center spacing larger than the first center-to-center spacing; and inserting the end portions of the optical fibers into the ferrule fiber openings while the optical fibers are maintained at the second center-to-center spacing by the ferrule boot.

Aspect 9. The method of aspect 8, wherein the ferrule boot is grasped as the end portions of the optical fibers are inserted into the ferrule fiber openings, and wherein the ferrule boot is manually squeezed at major sides of the ferrule boot to encourage the optical fibers to spread within the ferrule boot.

Aspect 10. The method of aspect 9, wherein the ferrule boot is secured in a rear end of the multi-fiber ferrule after the optical fibers have been inserted into the ferrule fiber openings.

Aspect 11. The method of aspect 10, wherein the end portions of the optical fibers are secured within the multi-fiber ferrule by an adhesive material, and Wherein the ferrule boot assists in containing the adhesive material in the multi-fiber ferrule prior to curing of the adhesive material.

Aspect 12. The method of aspect 8, wherein the ferrule boot fiber openings neck down as the ferrule boot fiber openings extend towards a front end of the ferrule boot.

Aspect 13. The method of aspect 8, wherein the ferrule boot fiber openings are arranged at the second center-to-center spacing.

Aspect 14. The method of aspect 8, wherein the average spacing of the ferrule boot fiber openings is equal to second center-to-center spacing.

Aspect 15. A fiber optic assembly comprising:

a fiber ribbon including a plurality of optical fibers maintained at a first center-to-center spacing;

a multi-fiber ferrule including a front end and a rear end, the multi-fiber ferrule including a row of ferrule fiber openings adjacent the front end of the ferule, the ferule fiber openings being arranged at a second center-to-center spacing that is larger than the first center-to-center spacing, the plurality of optical fibers having end portions secured within the ferrule fiber openings such that the end portions of the plurality of optical fibers are arranged at the second center-to-center spacing within the multi-fiber ferrule; and a ferrule boot secured within the multi-fiber ferrule adjacent the rear end of the ferrule, the ferrule boot defining a row of ferrule boot fiber openings arranged at an average center-to-center spacing that is larger than the first center-to-center spacing, the plurality of optical fibers being arranged to extend through the ferrule boot fiber openings.

Aspect 16. The fiber optic assembly of aspect 15, wherein the fiber ribbon is a rollable fiber ribbon.

Aspect 17. The fiber optic assembly of aspect 15, wherein the first center-to-center spacing is about 200 microns and the second center-to-center spacing is about 250 microns.

Aspect 18. The fiber optic assembly of any of aspects 15-17, wherein the fiber ribbon includes a transition region positioned behind the ferrule boot where the plurality of optical fibers transition from the first center-to-center spacing toward the average center-to-center spacing.

Aspect 19. The fiber optic assembly of aspect 15, wherein the ferrule boot fiber openings have diameters smaller than the second center-to-center spacing and the average center-to-center spacing of the ferrule boot fiber openings.

Aspect 20. The fiber optic assembly of aspect 15, wherein the multi-fiber ferrule defines a window for receiving epoxy to secure the end portions of the plurality of optical fibers within the ferrule fiber openings.

Aspect 21. The fiber optic assembly of aspect 15, wherein the ferrule boot fiber openings neck down as the ferrule boot fiber openings extend towards a front end of the ferrule boot.

Aspect 22. The fiber optic assembly of aspect 15, wherein the ferrule boot fiber openings are arranged at the second center-to-center spacing.

Aspect 23. The fiber optic assembly of aspect 15, wherein the average spacing of the ferrule boot fiber openings is equal to second center-to-center spacing.

Aspect 24. The fiber optic assembly of aspect 15, wherein the average spacing of the ferrule boot fiber openings is between the first center-to-center spacing and the second center-to-center spacing.

Aspect 25. The fiber optic assembly of aspect 15, wherein the ferrule boot openings are arranged in pairs of ferrule boot openings, wherein the ferrule boot openings of each pair of ferrule boot openings are separated by a first boot opening center-to-center spacing, and wherein the ferrule boot openings of adjacent ones of the pairs of ferrule boot openings are separated by a second boot opening center-to-center spacing that is larger than the first boot opening center-to-center spacing.

Aspect 26. The fiber optic assembly of aspect 25, wherein the first boot opening center-to-center spacing is about 200 microns, and the second boot opening center-to-center spacing is about 300 microns.

Aspect 27, A fiber optic assembly comprising:

a fiber ribbon including a plurality of optical fibers;

a multi-fiber ferrule including a front end and a rear end, the multi-fiber ferrule including a row of ferrule fiber openings adjacent the front end of the ferrule, the ferrule fiber openings being arranged at a ferrule center-to-center spacing, the plurality of optical fibers having end portions secured within the ferrule fiber openings such that the end portions of the plurality of optical fibers are arranged at the ferrule center-to-center spacing within the multi-fiber ferrule; and a ferrule boot secured within the multi-fiber ferrule adjacent the rear end of the ferrule, the ferrule boot defining a row of ferrule boot fiber openings arranged in pairs of ferrule boot openings, wherein the ferrule boot openings of each pair of ferrule boot openings are separated by a first boot opening center-to-center spacing, and wherein the ferrule boot openings of adjacent ones of the pairs of ferrule boot openings are separated by a second boot opening center-to-center spacing that is larger than the first boot opening center-to-center spacing.

Aspect 28. The fiber optic assembly of aspect 27, wherein the first boot opening center-to-center spacing is about 200 microns, and the second boot opening center-to-center spacing is about 300 microns.

As used herein, a value is "about" a specified number if the value is equal to the specified number or within standard industry manufacturing tolerances of the specified number.

From the forgoing detailed description, it will be evident that modifications and variations can be made without departing from the spirit and scope of the disclosure.

What is claimed is:

1. A fiber optic assembly comprising:

a fiber ribbon including a plurality of optical fibers maintained at a first center-to-center spacing;

a multi-fiber ferrule including a front end and a rear end, the multi-fiber ferrule including a row of ferrule fiber openings adjacent the front end of the multi-fiber ferrule, the ferrule fiber openings being arranged at a second center-to-center spacing that is larger than the first center-to-center spacing, the plurality of optical fibers having end portions secured within the ferrule fiber openings such that the end portions of the plurality of optical fibers are arranged at the second center-to-center spacing within the multi-fiber ferrule; and a ferrule boot including a rear end and a front end, the front end secured within the multi-fiber ferrule adjacent the rear end of the multi-fiber ferrule, the ferrule boot defining a row of ferrule boot fiber openings arranged at the first center-to-center spacing at the rear end, each ferrule boot fiber opening including a conical taper to funnel a received optical fiber of the plurality of optical fibers to the second center-to-center spacing at the front end of the ferrule boot, the plurality of optical fibers being arranged to extend through the ferrule boot fiber openings.

2. The fiber optic assembly of claim 1, wherein the fiber ribbon is a rollable fiber ribbon.

3. The fiber optic assembly of claim 1, wherein the first center-to-center spacing is about 200 microns and the second center-to-center spacing is about 250 microns.

4. The fiber optic assembly of claim 2, wherein the fiber ribbon includes a transition region positioned behind the ferrule boot where the plurality of optical fibers transition from the first center-to-center spacing toward the second center-to-center spacing.

5. The fiber optic assembly of claim 1, wherein the ferrule boot fiber openings have diameters smaller than the second center-to-center spacing.

6. The fiber optic assembly of claim 1, wherein the multi-fiber ferule defines a window for receiving epoxy to secure the end portions of the plurality of optical fibers within the ferrule fiber openings.

7. The fiber optic assembly of claim 1, wherein the ferrule boot includes a front portion and a rear portion, wherein an interior of the front portion defines an inner slot that is not divided into separate openings and that has a cross-sectional shape that is elongate along a width of the ferrule boot, wherein the inner slot includes a taper such that the inner slot expands in a height orientation as the inner slot extends in a forward direction, and wherein an interior of the rear portion is divided into a plurality of ferrule boot fiber openings that are parallel and that extend through the rear portion from the rear end of the ferrule boot toward the front portion.

8. A fiber optic assembly comprising:

a fiber ribbon including a plurality of optical fibers maintained at a first center-to-center spacing;

a multi-fiber ferrule including a front end and a rear end, the multi-fiber ferrule including a row of ferrule fiber openings adjacent the front end of the multi-fiber ferrule, the ferrule fiber openings being arranged at a second center-to-center spacing that is larger than the first center-to-center spacing, the plurality of optical fibers having end portions secured within the ferrule fiber openings such that the end portions of the plurality of optical fibers are arranged at the second center-to-center spacing within the multi-fiber ferrule; and a ferrule boot secured within the multi-fiber ferrule adjacent the rear end of the multi-fiber ferrule, the ferrule boot defining a row of ferrule boot fiber openings arranged at an average center-to-center spacing that is larger than the first center-to-center spacing, the plurality of optical fibers being arranged to extend through the ferrule boot fiber openings, wherein the ferrule boot fiber openings are arranged in pairs of ferrule boot fiber openings, wherein the ferrule boot fiber openings of each pair of ferrule boot fiber openings are separated by a first ferrule boot fiber opening center-to-center spacing, and wherein the ferrule boot fiber openings of adjacent ones of the pairs of ferrule boot fiber openings are separated by a second ferrule boot fiber opening center-to-center spacing that is larger than the first ferrule boot fiber opening center-to-center spacing.

9. The fiber optic assembly of claim 8, wherein the fiber ribbon is a rollable fiber ribbon.

10. The fiber optic assembly of claim 8, wherein the first center-to-center spacing is about 200 microns and the second center-to-center spacing is about 250 microns.

11. The fiber optic assembly of claim 8, wherein the fiber ribbon includes a transition region positioned behind the ferrule boot where the plurality of optical fibers transition from the first center-to-center spacing toward the average center-to-center spacing.

12. The fiber optic assembly of claim 8, wherein the ferrule boot fiber openings have diameters smaller than the second center-to-center spacing and the average center-to-center spacing of the ferrule boot fiber openings.

13. The fiber optic assembly of claim 8, wherein the multi-fiber ferrule defines a window for receiving epoxy to secure the end portions of the plurality of optical fibers within the ferrule fiber openings.

14. The fiber optic assembly of claim 8, wherein the ferrule boot fiber openings neck down as the ferrule boot fiber openings extend towards a front end of the ferrule boot.

15. The fiber optic assembly of claim 8, wherein the average center-to-center spacing of the ferrule boot fiber openings is equal to the second center-to-center spacing.

16. The fiber optic assembly of claim 8, wherein the average center-to-center spacing of the ferrule boot fiber openings is between the first center-to-center spacing and the second center-to-center spacing.

17. The fiber optic assembly of claim 8, wherein the first ferrule boot fiber opening center-to-center spacing is about 200 microns, and the second ferrule boot fiber opening center-to-center spacing is about 300 microns.

18. A fiber optic assembly comprising:

a fiber ribbon including a plurality of optical fibers;

a multi-fiber ferrule including a front end and a rear end, the multi-fiber ferrule including a row of ferrule fiber openings adjacent the front end of the multi-fiber ferrule, the ferrule fiber openings being arranged at a ferrule center-to-center spacing, the plurality of optical fibers having end portions secured within the ferrule fiber openings such that the end portions of the plurality of optical fibers are arranged at the ferrule center-to-center spacing within the multi-fiber ferrule; and a ferrule boot secured within the multi-fiber ferrule adjacent the rear end of the multi-fiber ferrule, the ferrule boot defining a row of ferrule boot fiber openings arranged in pairs of ferrule boot fiber openings, wherein the ferrule boot fiber openings of each pair of ferrule boot fiber openings are separated by a first ferrule boot fiber opening center-to-center spacing, and wherein the ferrule boot fiber openings of adjacent ones of the pairs of ferrule boot fiber openings are separated by a second ferrule boot fiber opening center-to-center spacing that is larger than the first ferrule boot fiber opening center-to-center spacing, wherein the ferrule boot includes a front portion and a rear portion, wherein an interior of the front portion defines an inner slot that is not divided into separate openings and that has a cross-sectional shape that is elongate along a width of the ferrule boot, wherein the inner slot includes a taper such that the inner slot expands in a height orientation as the inner slot extends in a forward direction, and wherein an interior of the rear portion is divided into a plurality of ferrule boot fiber openings that are parallel and that extend through the rear portion from the rear end of the ferrule boot toward the front portion.

19. The fiber optic assembly of claim 18, wherein the first ferrule boot fiber opening center-to-center spacing is about 200 microns, and the second ferrule boot fiber opening center-to-center spacing is about 300 microns.

* * * * *